United States Patent
Hatanaka

(10) Patent No.: US 11,882,100 B2
(45) Date of Patent: Jan. 23, 2024

(54) COMMUNICATION CONTROL DEVICE AND COMMUNICATION SYSTEM

(71) Applicants: KABUSHIKI KAISHA TOSHIBA, Tokyo (JP); Toshiba Infrastructure Systems & Solutions Corporation, Kawasaki (JP)

(72) Inventor: Issei Hatanaka, Kawasaki (JP)

(73) Assignees: KABUSHIKI KAISHA TOSHIBA, Tokyo (JP); Toshiba Infrastructure Systems & Solutions Corporation, Kawasaki (JP)

( * ) Notice: Subject to any disclaimer, the term of this patent is extended or adjusted under 35 U.S.C. 154(b) by 183 days.

(21) Appl. No.: 17/446,623

(22) Filed: Sep. 1, 2021

(65) Prior Publication Data

US 2021/0400026 A1    Dec. 23, 2021

Related U.S. Application Data

(63) Continuation of application No. PCT/JP2020/008464, filed on Feb. 28, 2020.

(30) Foreign Application Priority Data

Mar. 4, 2019   (JP) ................................ 2019-038376

(51) Int. Cl.
*H04L 9/40* (2022.01)
(52) U.S. Cl.
CPC ...... *H04L 63/0428* (2013.01); *H04L 63/0823* (2013.01); *H04L 63/0892* (2013.01)
(58) Field of Classification Search
None
See application file for complete search history.

(56) References Cited

U.S. PATENT DOCUMENTS

| 10,979,220 B2 | 4/2021 | Tanizawa |
| 2005/0188196 A1 | 8/2005 | Kakii |

(Continued)

FOREIGN PATENT DOCUMENTS

| JP | 2004-229091 A | 8/2004 |
| JP | 2004-350025 A | 12/2004 |

(Continued)

OTHER PUBLICATIONS

International Search Report dated May 19, 2020 in PCT/JP2020/008464 filed on Feb. 28, 2020, 2 pages.

(Continued)

*Primary Examiner* — Brandon Hoffman
(74) *Attorney, Agent, or Firm* — Maier & Maier, PLLC

(57) ABSTRACT

According to an embodiment, a communication control device includes a first communication system connected between a first device and a network communication network, and a second communication system connected between the first device and the network communication network separately from the first communication system. The first communication system and the second communication system each include a controller. The controller executes switching such that one of the communication systems executes communication in the first communication mode, and when a problem is detected in the communication system that is executing communication in the first communication mode, the other communication system executes communication in the first communication mode.

12 Claims, 21 Drawing Sheets

(56) References Cited

U.S. PATENT DOCUMENTS

| | | | |
|---|---|---|---|
| 2011/0202755 A1 | 8/2011 | Orsini et al. | |
| 2011/0231649 A1* | 9/2011 | Bollay | H04L 63/0245 |
| | | | 713/153 |
| 2018/0062837 A1* | 3/2018 | Tanizawa | H04L 9/0852 |
| 2018/0124606 A1 | 5/2018 | Macy et al. | |
| 2020/0204549 A1 | 6/2020 | Tomoeda et al. | |

FOREIGN PATENT DOCUMENTS

| | | |
|---|---|---|
| JP | 2005-223892 A | 8/2005 |
| JP | 2009-117887 A | 5/2009 |
| JP | 2014-195331 A | 10/2014 |
| JP | 2018-037888 A | 3/2018 |
| JP | 2019-050485 A | 3/2019 |

OTHER PUBLICATIONS

Extended European Search Report dated Sep. 19, 2022, in corresponding European Application No. 20765713.1, 10 pages.
Frankel et al., "IP Security (IPsec) and Internet Key Exchange (IKE) Document Roadmap", Feb. 2011, 63 pages.
Palomares et al., "High Availability for IPsec VPN Platforms: ClusterIP Evaluation", 2013 International Conference on Availability, Reliability, and Security, IEE, 10 pages.
Rescorla, "The Transport Layer Security (TLS) Protocol Version 1.3", Aug. 2018, 160 pages.
Van Thanh et al., "Pervasive Service Access with SIM-based VPN", IEEE, Oct. 12, 2009, 6 pages.
Office Action dated Dec. 26, 2022, in corresponding Singapore Application No. 11202109221R, 9 pages.

* cited by examiner

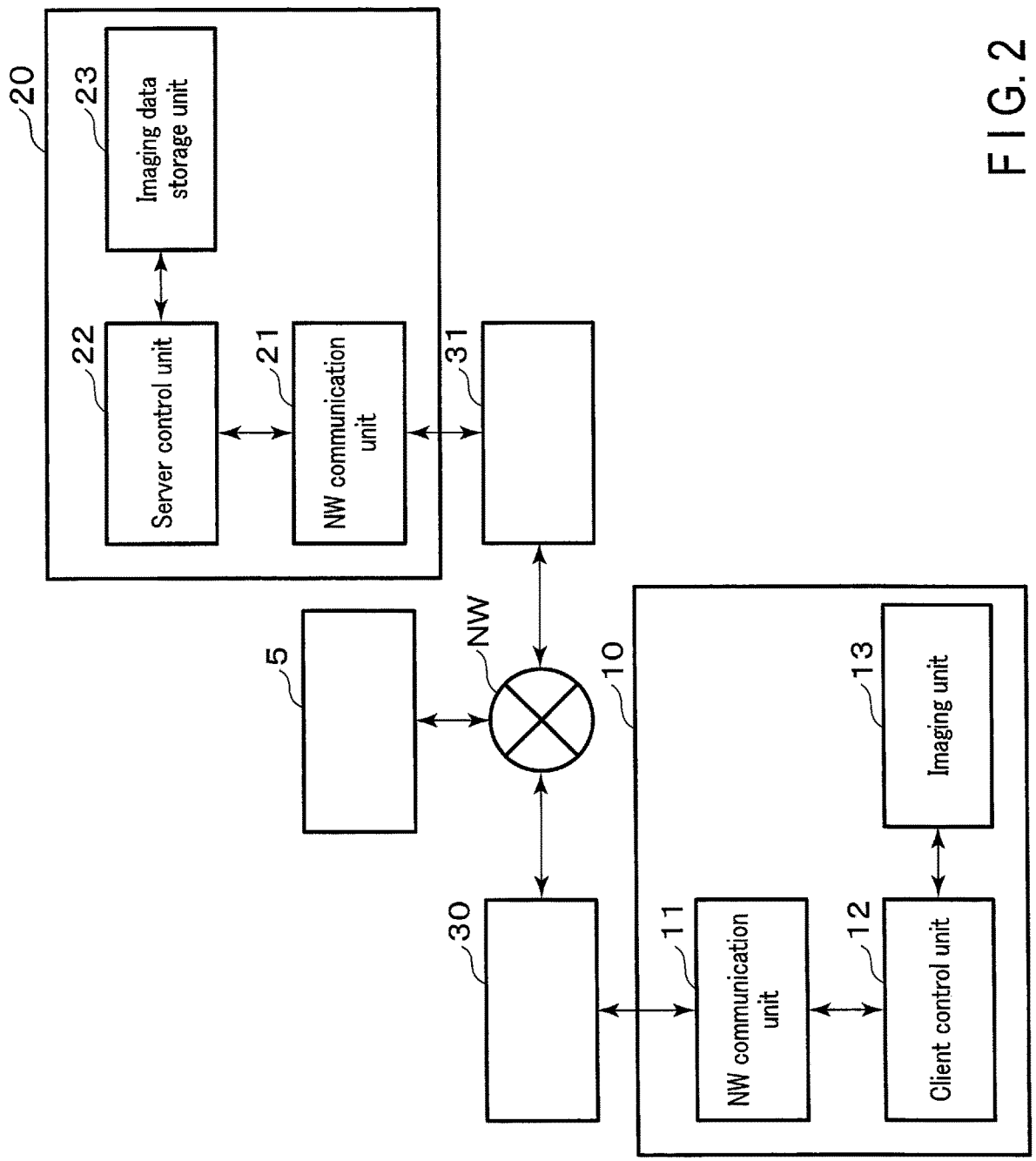
F I G. 2

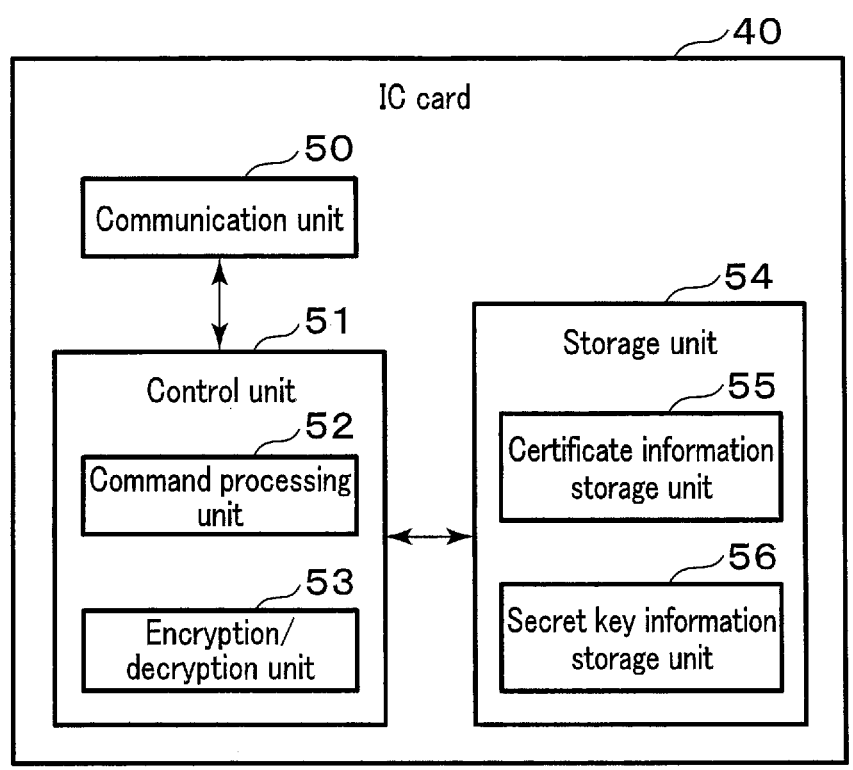
F I G. 5

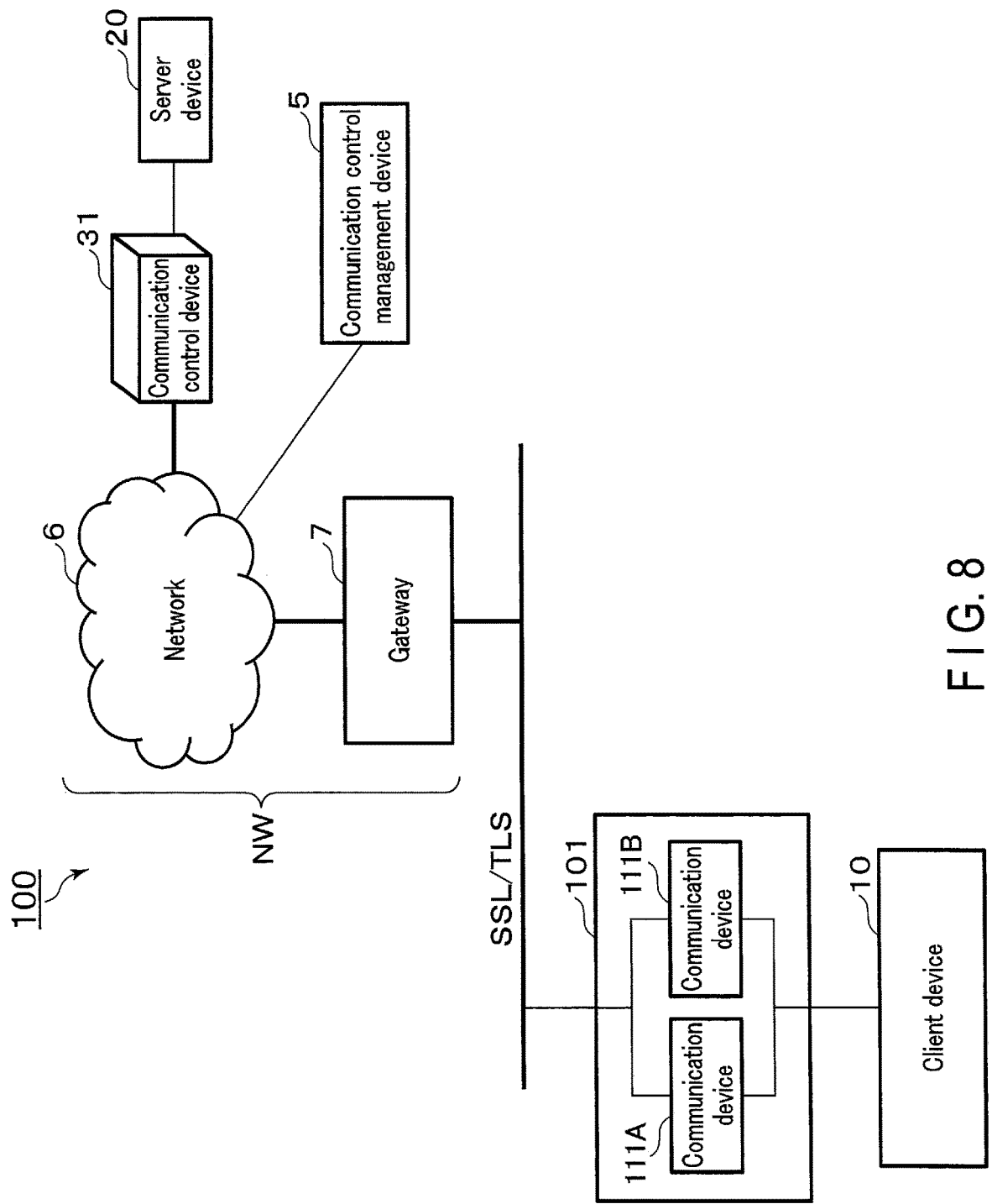
F I G. 8

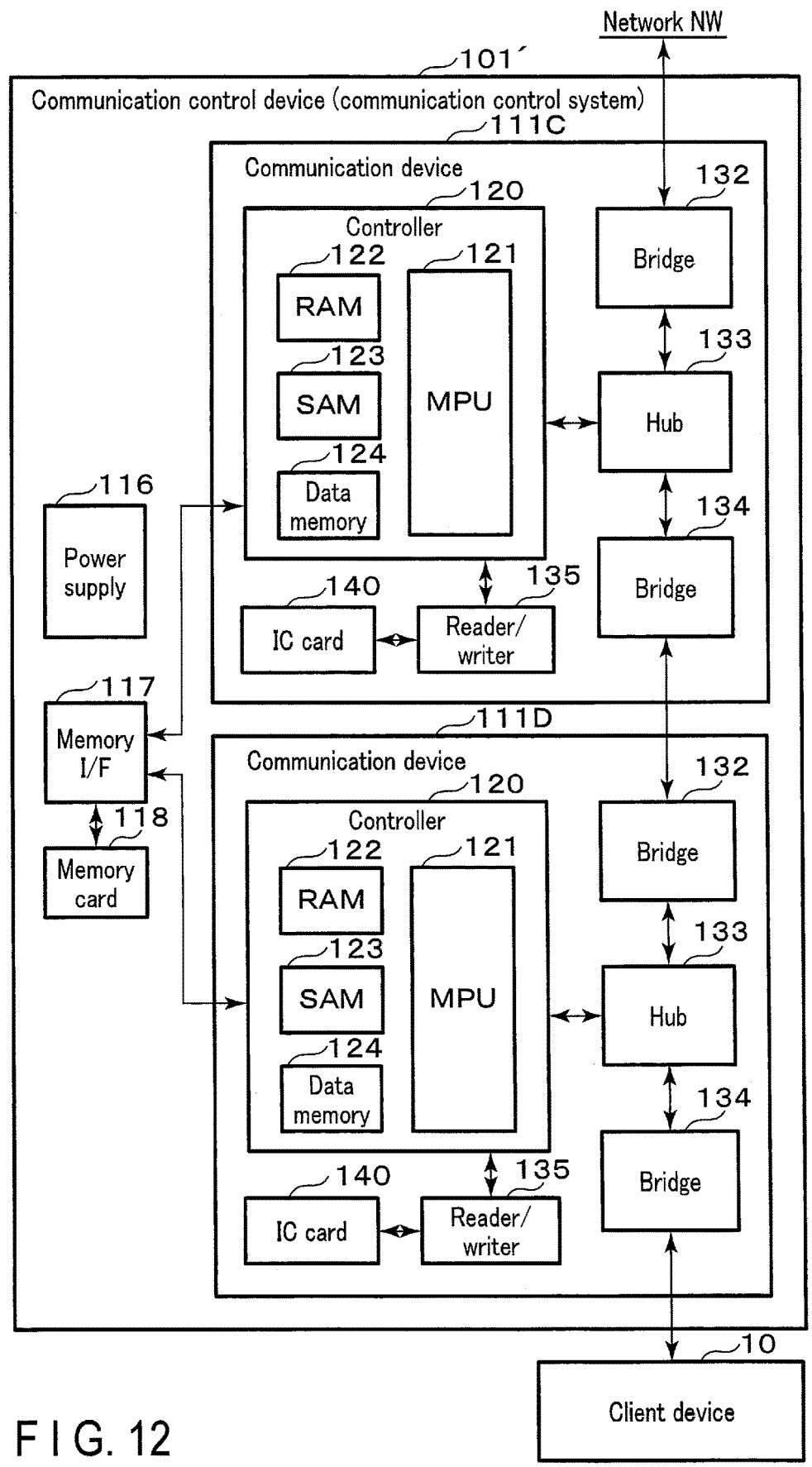
F I G. 12

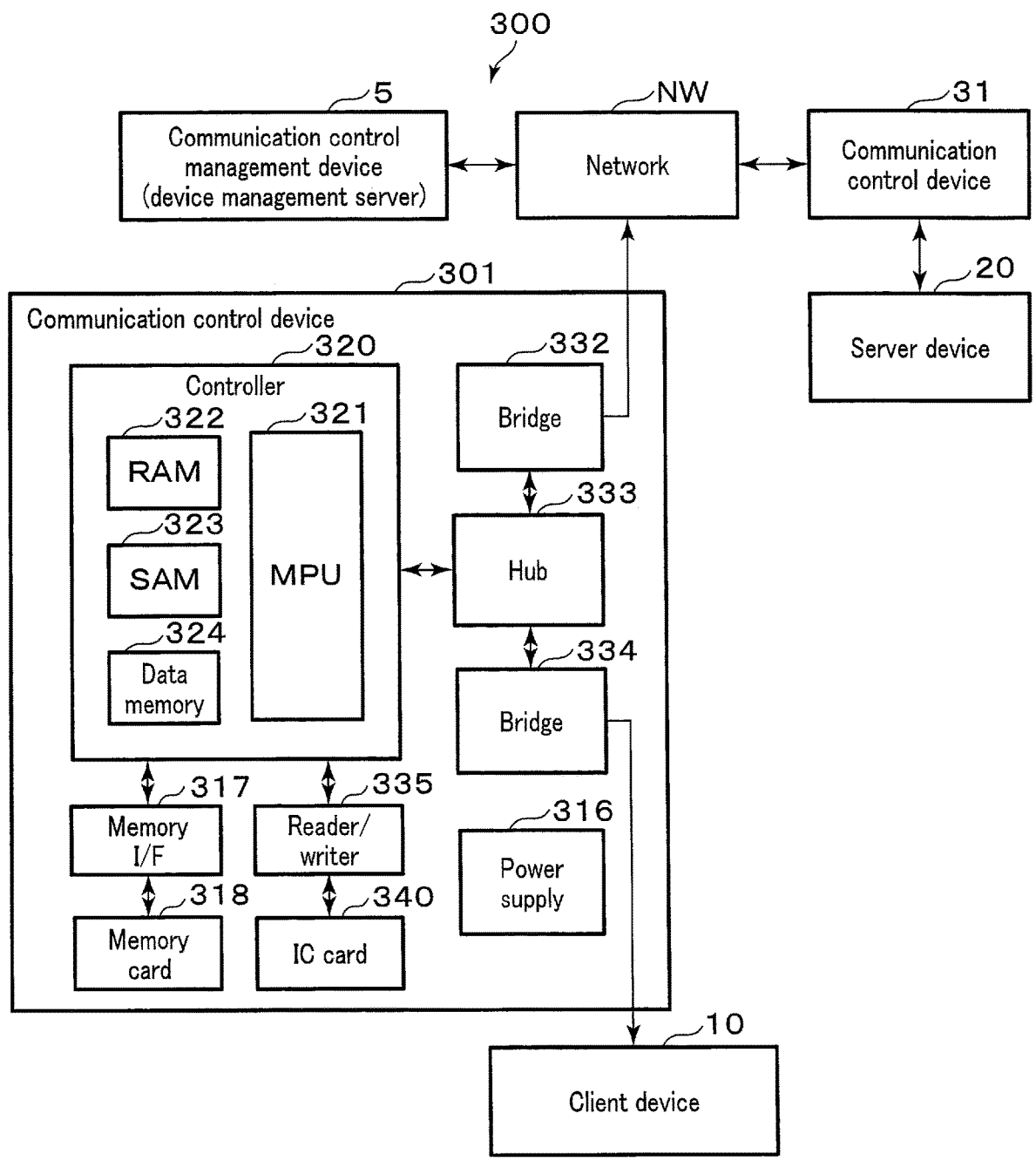
F I G. 17

COMMUNICATION CONTROL DEVICE AND COMMUNICATION SYSTEM

CROSS REFERENCE TO RELATED APPLICATIONS

This application is a Continuation Application of PCT Application No. PCT/JP2020/008464, filed Feb. 28, 2020 and based upon and claiming the benefit of priority from Japanese Patent Application No. 2019-038376, filed Mar. 4, 2019, the entire contents of all of which are incorporated herein by reference.

FIELD

Embodiments described herein relate generally to a communication control device and a communication system.

BACKGROUND

In a communication system, data to be handled and equipment control information require protection from a malware attack or the like. For example, equipment such as a monitoring camera installed as a social infrastructure needs to ensure the security of data to be communicated. However, it is difficult to frequently replace equipment constituting the social infrastructure such as a monitoring camera post-installation, giving rise to the problem that the security measures may be insufficient.

CITATION LIST

PATENT LITERATURE 1: Jpn. Pat. Appln. KOKAI Publication No. 2009-117887

SUMMARY

Technical Problem

An object of the present invention is to provide a communication control device and a communication system capable of improving the security of communication used in a social infrastructure system or the like.

Solution to Problem

According to an embodiment, a communication control device includes a first communication system connected between a first device and a network communication network, and a second communication system connected between the first device and the network communication network separately from the first communication system. The first communication system and the second communication system each include a controller. The controller executes communication in a first communication mode for transmitting, to a second communication control device, information obtained by encrypting information transmitted from the first device to the second device, and transmitting, to the first device, information obtained by decrypting information transmitted from the second device to the first device, using a common key determined by a mutual authentication process with the second communication control device connected between the network communication network and the second device using a secret key and a certificate issued by a private authentication authority. The controller executes switching such that one of the communication systems executes communication in the first communication mode, and when a problem is detected in the communication system executing communication in the first communication mode, the other communication system executes communication in the first communication mode.

BRIEF DESCRIPTION OF THE DRAWINGS

FIG. 2 is a block diagram showing an example of functional configurations of a client device and a server device according to each embodiment.

FIG. 5 is a block diagram showing an example of a functional configuration of a C card as a configuration example of an authentication unit in the communication control device according to each embodiment.

FIG. 8 is a diagram showing a first configuration example of a communication system according to a first embodiment.

FIG. 12 is a block diagram showing a configuration example of a communication control device in the second configuration example of the communication system according to the first embodiment.

FIG. 17 is a block diagram showing a configuration example of a communication system according to a third embodiment.

DETAILED DESCRIPTION

Hereinafter, each embodiment will be described with reference to the drawings.

First, a basic configuration example and an operation example serving as a base of a communication system according to each embodiment will be described.

Figure 1:
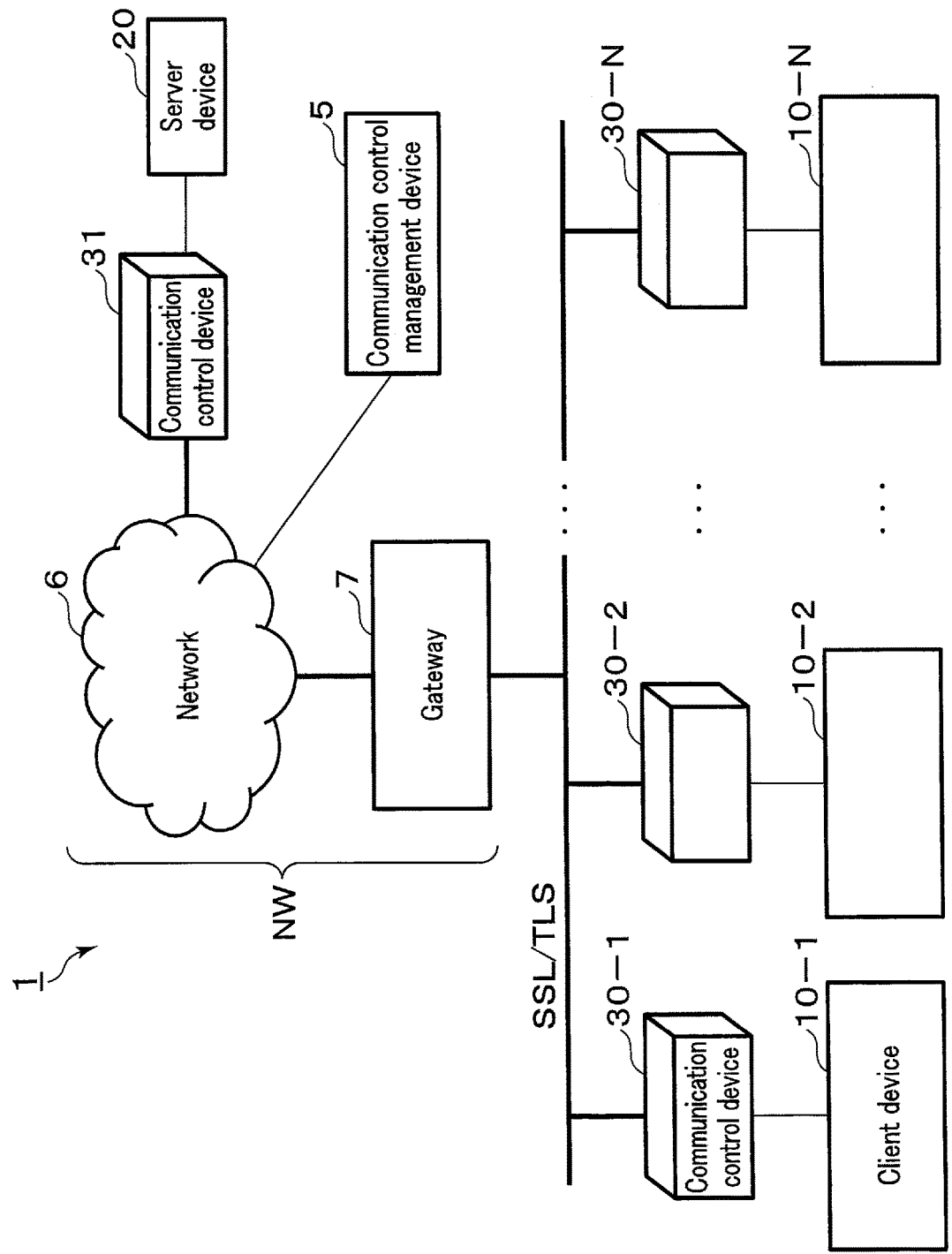
FIG. 1 is a diagram showing an example of a basic configuration of a communication system according to each embodiment.

FIG. 1 is a diagram showing a configuration example of a communication system 1 having a basic configuration of the communication system according to each embodiment.

The communication system 1 includes a client device 10 (10-1 to 10-N), a server device 20, a client-side communication control device 30 (30-1 to 30-N) (an example of "first communication control device"), a server-side communication control device 31 (an example of "first communication control device"), a communication control management device 5 (an example of "private authentication authority"), a network 6, and a gateway 7. In the following description, the network 6 and the gateway 7 that connects the network 6 and the client device 10 and the like are also collectively referred to as the "network NW".

The client device 10 is connected to the network NW via the client-side communication control device 30. The server device 20 is connected to the network NW via the server-side communication control device 31. Details of the configurations of the client device 10 and the server device 20 will be described later.

The client-side communication control device 30 is connected between the client device 10 and the network NW and mediates communication between the client device 10 and the server device 20. The client-side communication control device 30 acquires data transmitted by the client device 10 to the server device 20 and outputs the acquired data to the server device 20. Here, when data is transmitted to the server device 20, the client-side communication control device 30 encrypts data acquired from the client device 10 and transmits the encrypted data to the server device 20.

The client-side communication control device 30 acquires data transmitted by the server device 20 to the client device 10 and outputs the acquired data to the client device 10. Here, the data acquired by the client-side communication control device 30 is encrypted data. When data is output to the client device 10, the client-side communication control device 30 decrypts the data acquired from the server device 20 via the server-side communication control device 31 and outputs the decrypted data to the client device 10.

The server-side communication control device 31 is connected between the server device 20 and the network NW and mediates communication between the client device 10 and the server device 20. The server-side communication control device 31 acquires data transmitted by the server device 20 to the client device 10 and transmits the acquired data to the client device 10. Here, when data is transmitted to the client device 10, the server-side communication control device 31 encrypts the data acquired from the server device 20 and transmits the encrypted data to the client device 10.

The server-side communication control device 31 acquires data transmitted by the client device 10 to the server device 20 and outputs the acquired data to the server device 20. Here, the data acquired by the server-side communication control device 31 is encrypted data. When data is output to the server device 20, the server-side communication control device 31 decrypts the data acquired from the client device 10 via the client-side communication control device 30 and outputs the decrypted data to the server device 20.

In the data encryption performed by the client-side communication control device 30 and the server-side communication control device 31, encryption based on, for example, a secure socket layer (SSL)/transport layer security (TLS) protocol, is performed. For example, the client-side communication control device 30 and the server-side communication control device 31 combine the SSL/TLS protocol with an HTTP to encrypt data included in the HTTP and to replace the encrypted data with that of HTTP secure (HTTPS) in which security is improved.

The data encryption performed by the client-side communication control device 30 and the server-side communication control device 31 is not limited to a change of the HTTP to the HTTPS. The client-side communication control device 30 and the server-side communication control device 31 may replace the SSL/TLS protocol with a secure communication protocol for improving security by combining the SSL/TLS protocol with various communication protocols. For example, the client-side communication control device 30 and the server-side communication control device 31 may replace a file transfer protocol (FTP) with FTP secure (FTPS).

In the communication system 1, the data encrypted by the client-side communication control device 30 or the server-side communication control device 31 is output to the network NW. In other words, in the communication system 1, data flowing through the network NW is encrypted data. Thus, it is possible to avoid a risk that data transmitted/received through the network NW is maliciously accessed from the outside and the data is intercepted, thereby improving security. The term "data interception" here means an "act of stealing a glance at data" or an "act of extracting data".

The communication control management device 5 is a communication management server for managing communication using a client-side communication control device and a server-side communication control device. For example, the communication control management device 5 issues a client certificate and a secret key to the client-side communication control device 30. In the configuration example shown in FIG. 1, the communication control management device 5 issues a client certificate and a secret key to be stored in an IC card which is attached to the client-side communication control device 30. Further, the communication control management device 5 transmits via the network NW the client certificate and the secret key to be stored in the IC card to the client-side communication control device 30 to which the IC card is attached.

The communication control management device 5 issues a server certificate and a secret key to the server-side communication control device 31. For example, the communication control management device 5 issues a server certificate and a secret key to be stored in the IC card. Further, the communication control management device 5 transmits via the network NW the server certificate and the secret key to be stored in the IC card to the server-side communication control device 31 to which the IC card is attached. Each of the client certificate, the server certificate, and the secret key is information required to determine a common key (a session key) used when the client-side communication control device 30 and the server-side communication control device 31 perform encrypted communication Here, the configurations of the client device 10 and the server device 20 will be described. The client device 10 and the server device 20 are structural elements (components) that constitute a social infrastructure system. For example, the social infrastructure is a facility necessary for providing a social base such as a road traffic network, a power generation facility, a power distribution facility, a water treatment facility, or a gas distribution facility. The social infrastructure system is, for example, a mechanism for stably operating the social infrastructure by monitoring the social infrastructure, ascertaining a change in the situation, and coping with the change. In the following, an example in which the client device 10 and the server device are components of a monitoring system that monitors roads and public facilities will be described. In this case, the client device 10 is a device that transmits imaging data obtained by imaging a road condition or the like via the network NW (a network monitoring camera). The server device 20 is a device that receives the imaging data transmitted by the client device 10 via the network NW.

The client device 10 and the server device 20 are not limited to the components of the monitoring system. For example, the client device 10 and the server device may be components of a system that monitors a power situation in the power generation facility or the power distribution facility, or components of a system that acquires a distribution situation in a logistics center, a system that acquires an operation situation of a facility in a factory or research institution, or the like.

FIG. 2 is a block diagram showing an example of functional configurations of the client device 10 and the server device 20 shown in FIG. 1.

The client device 10 includes a network (NW) communication unit 11, a client control unit 12, and an imaging unit 13. The NW communication unit 11 is, for example, an Ethernet (registered trademark) port of the client device 10. The NW communication unit 11 is connected to the client-side communication control device 30 and outputs data transmitted from the client device 10 to the server device 20 to the client-side communication control device 30. In the case of a conventional system, the NW communication unit 11 corresponds to a functional unit that is connected to the network NW and communicates with the server device 20 via the network NW.

The client control unit 12 is, for example, a processor including a CPU and the like and generally controls the client device 10. For example, the client control unit 12 causes the imaging unit 13 to start or stop imaging or sets imaging conditions such as a direction of the camera that performs imaging with respect to the imaging unit 13 and a magnification at the time of imaging in accordance with control from the server device 20.

The imaging unit 13 images a landscape at a predetermined location in accordance with an instruction from the client control unit 12. The imaging unit 13 outputs data obtained through imaging (imaging data) to the client control unit 12.

The server device 20 includes a network (NW) communication unit 21, a server control unit 22, and an imaging data storage unit 23. The NW communication unit 21 is, for example, an Ethernet (registered trademark) port of the server device 20. The NW communication unit 21 is connected to the server-side communication control device 31 and outputs data to be transmitted from the server device 20 to the client device 10 to the server-side communication control device 31. In the case of a conventional system, the NW communication unit 21 corresponds to a functional unit that is connected to the network NW and communicates with the client device 10 via the network NW.

The server control unit 22 is, for example, a processor including a CPU and the like and generally controls the server device 20. For example, the server control unit 22 causes the imaging data storage unit 23 to store imaging data obtained through imaging performed by the client device 10. The imaging data storage unit 23 stores the imaging data in accordance with an instruction of the server control unit 22.

When the client device 10 and the server device 20 are connected to each other via the NW communication unit and the network NW, an HTTP, which is a general communication protocol in a network monitoring camera, may be used in the communication between the client device and the server device 20.

In this case, unencrypted information (so-called plain text) output to the network NW by the client device 10 or the server device 20 flows through the network NW. In this case, if data on the network NW is acquired maliciously from the outside, there is a risk that imaging data can be easily intercepted or falsified. As a countermeasure against such an unauthorized attack, a case in which the client device 10 encrypts the imaging data and outputs the encrypted imaging data to the network NW is conceivable. For example, the client control unit 12 of the client device 10 encrypts the imaging data and outputs the encrypted imaging data to the network NW.

However, because a processor such as a CPU already provided in the monitoring camera is generally used for the purpose of compressing or encoding imaging data, a resource for performing an encryption process is not further provided in many cases. In such a case, the CPU originally provided in the client control unit 12 cannot encrypt imaging data. When the client control unit 12 causes the imaging data to be encrypted, a case is conceivable in which it is necessary to change or replace the hardware configuration of the client control unit 12 such that the client control unit 12 is further equipped with a processor for encrypting the imaging data. However, because the client device 10 is a component that constitutes a social infrastructure such as a monitoring camera, the hardware configuration cannot be easily changed or replaced. In view of such circumstances, it is desirable that imaging data be encrypted and output to the network NW without changing the client device 10.

In the communication system 1, the client-side communication control device 30 connected between the client device 10 and the network NW encrypts the data transmitted by the client device 10 and outputs the encrypted data to the network NW. The server-side communication control device 31 connected between the server device 20 and the network NW encrypts the control data transmitted by the server device 20 and outputs the encrypted control data to the network NW. This improves the security of the imaging data flowing through the network NW without changing the client device 10 and the server device 20.

Figure 3:
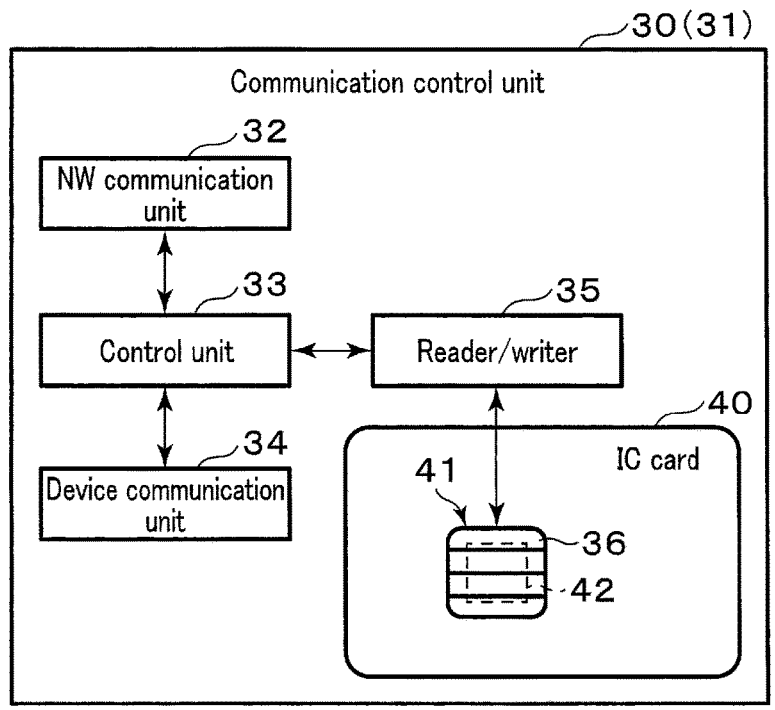
FIG. 3 is a block diagram showing an example of functional configurations of a client-side communication control device and a server-side communication control device according to each embodiment.

Here, the configurations of the client-side communication control device 30 and the server-side communication control device 31 will be described with reference to FIG. 3. FIG. 3 is a block diagram showing an example of functional configurations of the client-side communication control device 30 and the server-side communication control device 31 shown in FIG. 1. The functional configurations of the client-side communication control device 30 and the server-side communication control device 31 are the same. Thus, one configuration (for example, the configuration of the client-side communication control device 30) will be described below and the description of the other configuration (for example, the configuration of the server-side communication control device 31) will be omitted. Hereinafter, when the client-side communication control device 30 and the server-side communication control device 31 are not distinguished from each other, they are simply referred to as the communication control device 30 (31) and the like.

As shown in FIG. 3, the communication control device 30 (31) includes a network (NW) communication unit 32, a control unit 33, a device communication unit 34, a reader/writer 35, and an IC card 40.

Here, the IC card 40 is an example of an "authentication unit". The authentication unit is not limited to one implemented by the reader/writer 35 and the IC card 40. The authentication unit may be implemented by the control unit 33 or a processing circuit for authentication processing.

The NW communication unit 32 is connected to the network NW and communicates with the other communication control device 30 (31) via the network NW.

The control unit 33 is, for example, a processor including a CPU and the like and generally controls the communication control device 30 (31). For example, the control unit 33 transmits a command to the IC card 40 and receives a response from the IC card 40 via the reader/writer 35. The control unit 33 transmits information based on the response received from the IC card 40 to the other communication control device 30 (31) via the NW communication unit 32. The control unit 33 transmits a command to the IC card 40 on the basis of the information received from the other communication control device 30 (31) via the NW communication unit 32.

The device communication unit 34 is connected to the device (the client device 10 or the server device 20) and communicates with the device. Specifically, the device communication unit 34 of the client-side communication control device 30 is connected to the client device 10, acquires imaging data from the client device 10, and outputs decrypted control data to the client device 10. The device communication unit 34 of the server-side communication control device 31 is connected to the server device 20, acquires control data from the server device 20, and outputs decrypted imaging data to the server device 20.

The reader/writer 35 is connected to the IC card 40 via a contact unit 36 and communicates with the IC card 40.

The IC card 40 is formed, for example, by mounting an IC module 41 on a plastic card substrate. That is, the IC card 40 includes the IC module 41 and the card substrate in which the IC module 41 is embedded. The IC card 40 is attached to the communication control device 30 (31) so that the IC card 40 can be attached to or detached from the communication control device 30 (31) and can communicate with the communication control device 30 (31) via the contact unit 36.

The IC card 40 receives, for example, a command (a processing request) transmitted by the communication control device 30 (31) via the contact unit 36, and executes a process (command processing) according to the received command. Then, the IC card 40 transmits a response (a processing response), which is an execution result of the command processing, to the communication control device 30 (31) via the contact unit 36.

The IC module 41 includes the contact unit 36 and an IC chip 42. The contact unit 36 has terminals for various types of signals necessary for the operation of the IC card 40. Here, the terminals for various types of signals include terminals for receiving a power supply voltage, a clock signal, a reset signal, and the like from the communication control device 30 (31) and serial data input and output terminals (SIO terminals) for communicating with the communication control device 30 (31). For example, the IC chip 42 is large scale integration (LSI) such as a one-chip microprocessor.

Figure 4:
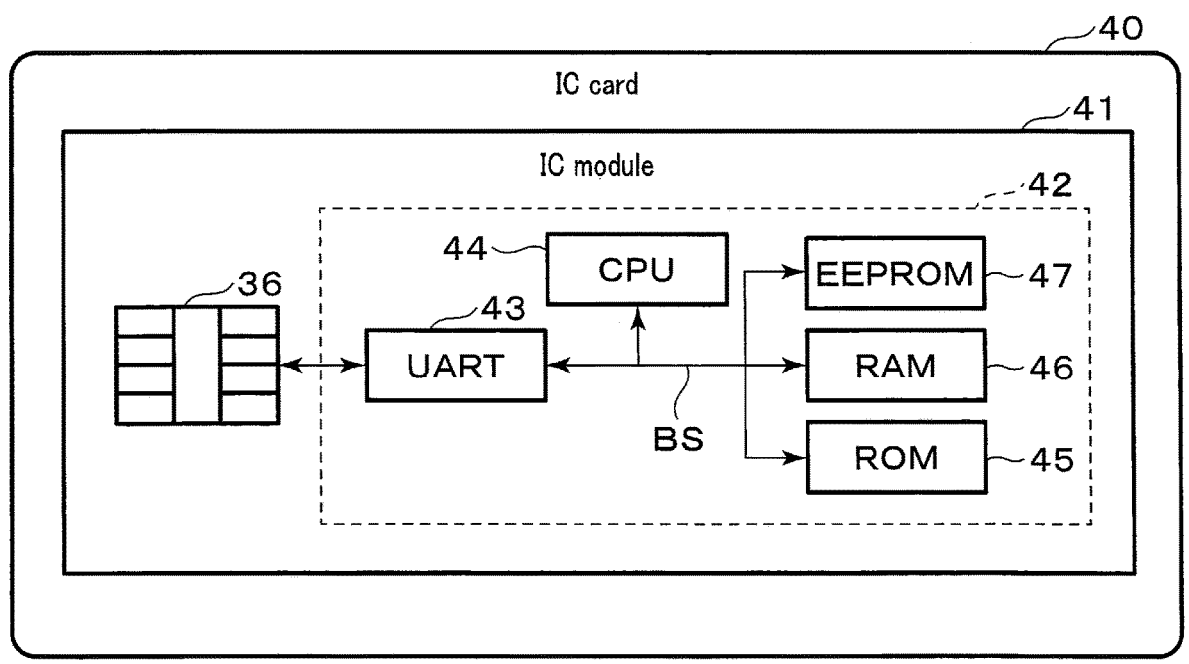
FIG. 4 is a diagram showing an example of a hardware configuration of an IC card as a configuration example of an authentication unit in the communication control device according to each embodiment.

Here, the hardware configuration of the IC card 40 will be described with reference to FIG. 4. FIG. 4 is a diagram showing an example of a hardware configuration of the IC card 40 shown in FIG. 3.

The IC card 40 includes the IC module 41 having the contact unit 36 and the IC chip 42. The IC chip 42 includes a universal asynchronous receiver transmitter (UART) 43, a CPU 44, a read only memory (ROM) 45, a random access memory (RAM) 46, and an electrically erasable programmable ROM (EEPROM (trademark)) 47. The respective components (43 to 47) are connected via an internal bus BS.

The UART 43 performs serial data communication with the communication control device 30 (31) via the SIO terminal described above. The UART 43 outputs data (for example, 1-byte data) obtained by converting the serial data signal received via the SIO terminal into parallel data to the internal bus BS. The UART 43 converts data acquired via the internal bus BS into serial data and outputs the serial data to the communication control device 30 (31) via the SIO terminal. For example, the UART 43 receives a command from the communication control device 30 (31) via the SIO terminal. The UART 43 transmits a response to the communication control device 30 (31) via the SIO terminal.

The CPU 44 executes various types of processes of the IC card 40 by executing a program stored in the ROM 45 or the EEPROM 47. For example, the CPU 44 executes command processing according to the command received by the UART 43 via the contact unit 36.

The ROM 45 is, for example, a non-volatile memory such as a mask ROM and stores data such as a program for executing various processes of the IC card 40 and a command table. The RAM 46 is, for example, a volatile memory such as a static RAM (SRAM) and temporarily stores data used when various types of processes of the IC card 40 are performed. The EEPROM 47 is, for example, an electrically rewritable nonvolatile memory. The EEPROM 47 stores various types of data used by the IC card 40. For example, the EEPROM 47 stores information used for various types of services (applications) using the IC card 40.

Next, the configuration of the IC card 40 will be described with reference to FIG. 5. FIG. 5 is a block diagram showing an example of a functional configuration of the IC card 40 shown in FIG. 4. The IC card 40 includes a communication unit 50, a control unit 51, and a storage unit 54. Here, each part of the IC card 40 shown in FIG. 5 is implemented using the hardware of the IC card 40 in FIG. 4.

The communication unit 50 is implemented by, for example, the UART 43, the CPU 44, and a program stored in the ROM 45, and, for example, transmits and receives a command and a response to and from the communication control device 30 (31) via the contact unit 36. That is, the communication unit 50 receives a command (a processing request) for requesting a predetermined process from the communication control device 30 (31) and transmits a response (a processing response) to the command to the communication control device 30 (31). The communication unit 50 causes the RAM 46 to store received data received from the communication control device 30 (31) via the UART 43. The communication unit 50 transmits transmission data stored in the RAM 46 to the communication control device 30 (31) via the UART 43.

The control unit 51 is implemented by, for example, the CPU 44, the RAM 45, the ROM 46, or the EEPROM 47, and generally controls the IC card 40. The control unit 51 includes a command processing unit 52 and an encryption/decryption unit 53.

Here, a process to be performed by the command processing unit 52 is an example of an "authentication process". A process to be performed by the encryption/decryption unit 53 is an example of an "encryption/decryption process".

The command processing unit 52 executes various types of command processing. For example, the command processing unit 52 performs an SSL/TLS handshake as command processing for transmitting an HTTPS request to be described later. In the SSL/TLS handshake, key information necessary for encrypted communication and the like is exchanged and mutual authentication with a communication destination device is performed. Here, the mutual authentication is an authentication process in which the client-side communication control device 30 and the server-side communication control device 31 mutually check that they are devices that are properly authenticated before communication is performed.

The encryption/decryption unit 53 executes a process of encrypting data and a process of decrypting the encrypted data. The encryption/decryption unit 53 encrypts the data output by the device (the client device 10 or the server device 20) acquired via the communication unit 50. The encryption/decryption unit 53 decrypts the encrypted data from the network NW acquired via the communication unit 50.

The storage unit 54 is, for example, a storage unit having the EEPROM 47 and includes a certificate information storage unit 55 and a secret information storage unit 56. The certificate information storage unit 55 stores a certificate for a device (the client device 10 or the server device 20) issued by the communication control management device 5. Specifically, information indicating the client certificate is stored in the certificate information storage unit 55 of the IC card 40 attached to the client-side communication control device 30. Information indicating the server certificate is stored in the certificate information storage unit 55 of the IC card 40 attached to the server-side communication control device 31.

The secret information storage unit 56 stores a secret key for the device (the client device 10 or the server device 20) issued by the communication control management device 5. Specifically, information indicating the secret key issued to the client-side communication control device 30 is stored in the secret information storage unit 56 of the IC card 40 attached to the client-side communication control device 30. Information indicating the secret key issued to the server-side communication control device 31 is stored in the certificate information storage unit 55 of the IC card 40 attached to the server-side communication control device 31.

Figure 6:
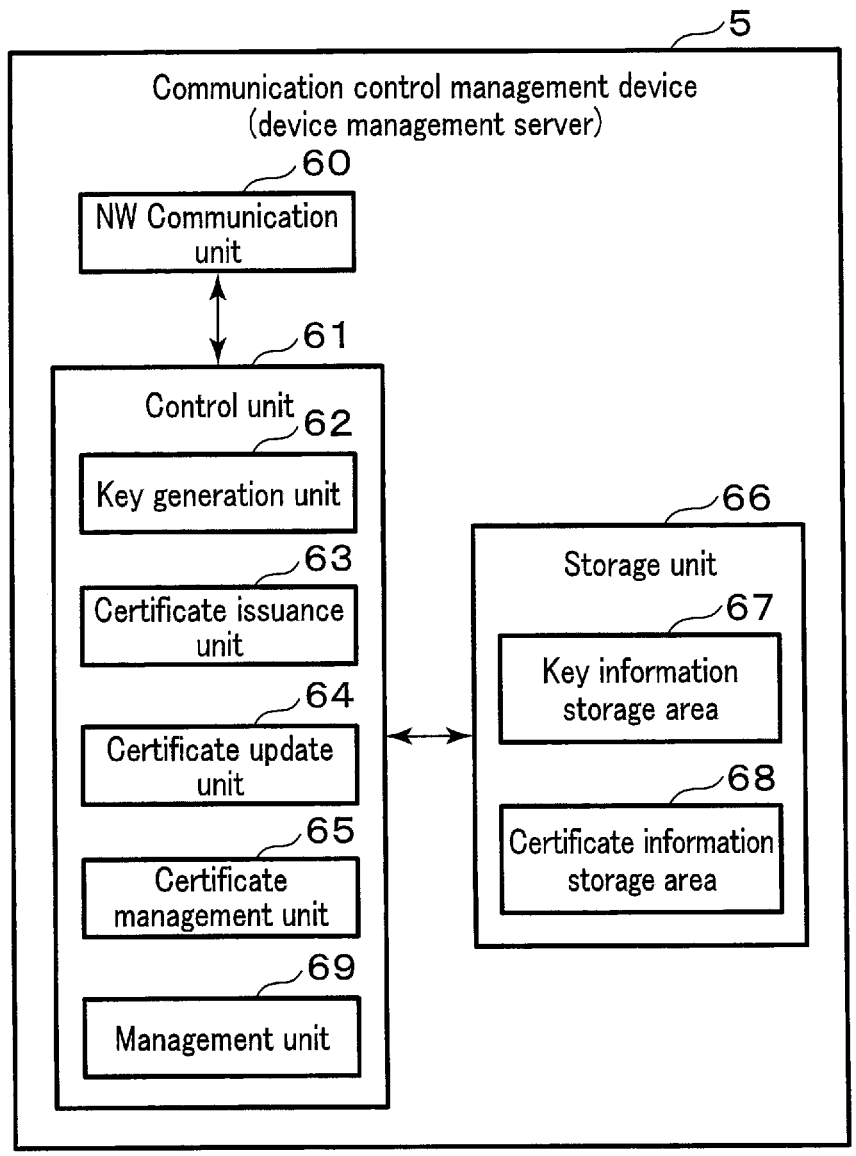
FIG. 6 is a block diagram showing an example of a functional configuration of a communication control management device according to each embodiment.

Here, the configuration of the communication control management device 5 will be described with reference to FIG. 6. FIG. 6 is a block diagram showing a configuration example of the communication control management device 5 shown in FIG. 1. The communication control management device 5 includes, for example, a network (NW) communication unit 60, a control unit 61, and a storage unit 66.

The NW communication unit 60 is connected to the network NW and communicates with the communication control device 30 (31) via the network NW.

The control unit 61 includes, for example, a processor such as a CPU. The control unit 61 implements various processes by the processor executing a program. The control unit 61 generally controls the communication control management device 5. The control unit 61 mainly operates as a private authentication authority that recognizes the validity of the communication control device 30 (31). In the example shown in FIG. 6, the control unit 61 executes processing for implementing functions as a key generation unit 62, a certificate issuance unit 63, a certificate update unit 64, a certificate management unit 65, and a management unit 69 by the processor executing a program.

For example, the key generation unit 62 issues a secret key corresponding to a public key included in a certificate to be described later on the basis of an authentication request from the communication control device 30 (31).

For example, the certificate issuance unit 63 issues a certificate that recognizes the validity of the communication control device 30 (31) on the basis of the authentication request from the communication control device 30 (31). The certificate includes a public key and information indicating an owner of the communication control device 30 (31).

The certificate update unit 64 updates the certificate by setting a new validity period for the certificate whose validity period has expired. The certificate update unit 64 issues, for example, a certificate in which the validity period of the certificate issued to the communication control device 30 (31) is extended on the basis of an update request from the communication control device 30 (31) and transmits the issued certificate to the communication control device 30 (31). Information indicating the issued certificate is received by the communication control device 30 (31) and stored in the certificate information storage unit 55 of the IC card 40 of the communication control device 30 (31), so that the validity period of the certificate of the communication control device 30 (31) is extended.

The certificate management unit 65 manages certificates that have already been issued. For example, the certificate management unit 65 performs a process of invalidating the certificate issued to the communication control device 30 (31) when validity in mutual authentication has not been mutually proved due to falsification, theft, or the like of the IC card 40 attached to the communication control device 30 (31). The certificate management unit 65 may be configured to respond regarding whether or not certificates issued to the communication control device 30 (31) and other communication devices have been issued by the certificate management unit 65 on the basis of an inquiry from the communication control device 30 (31). The certificate management unit 65 may be configured to periodically check whether the issued certificate is being used in the valid communication control device 30 (31).

The management unit 69 manages the communication control device 30 (31). For example, the management unit 69 remotely controls the mutual authentication to be performed by the communication control device 30 (31) via the network NW.

The storage unit 66 includes, for example, a key information storage area 67 and a certificate information storage area 68. The key information storage area 67 stores, for example, information indicating a public key or a secret key that has already been issued. The certificate information storage area 68 stores, for example, information indicating a certificate that has already been issued. The key information storage area 67 and the certificate information storage area 68 are referred to, for example, when the key generation unit 62 issues a secret key, when the certificate issuance unit 63 issues a certificate, or the like. The key information storage area 67 stores information indicating the secret key issued by the key generation unit 62. The certificate information storage area 68 stores information indicating the certificate issued by the certificate issuance unit 63.

Here, a flow of a process to be performed by the communication system 1 will be described with reference to FIG. 7.

Figure 7:
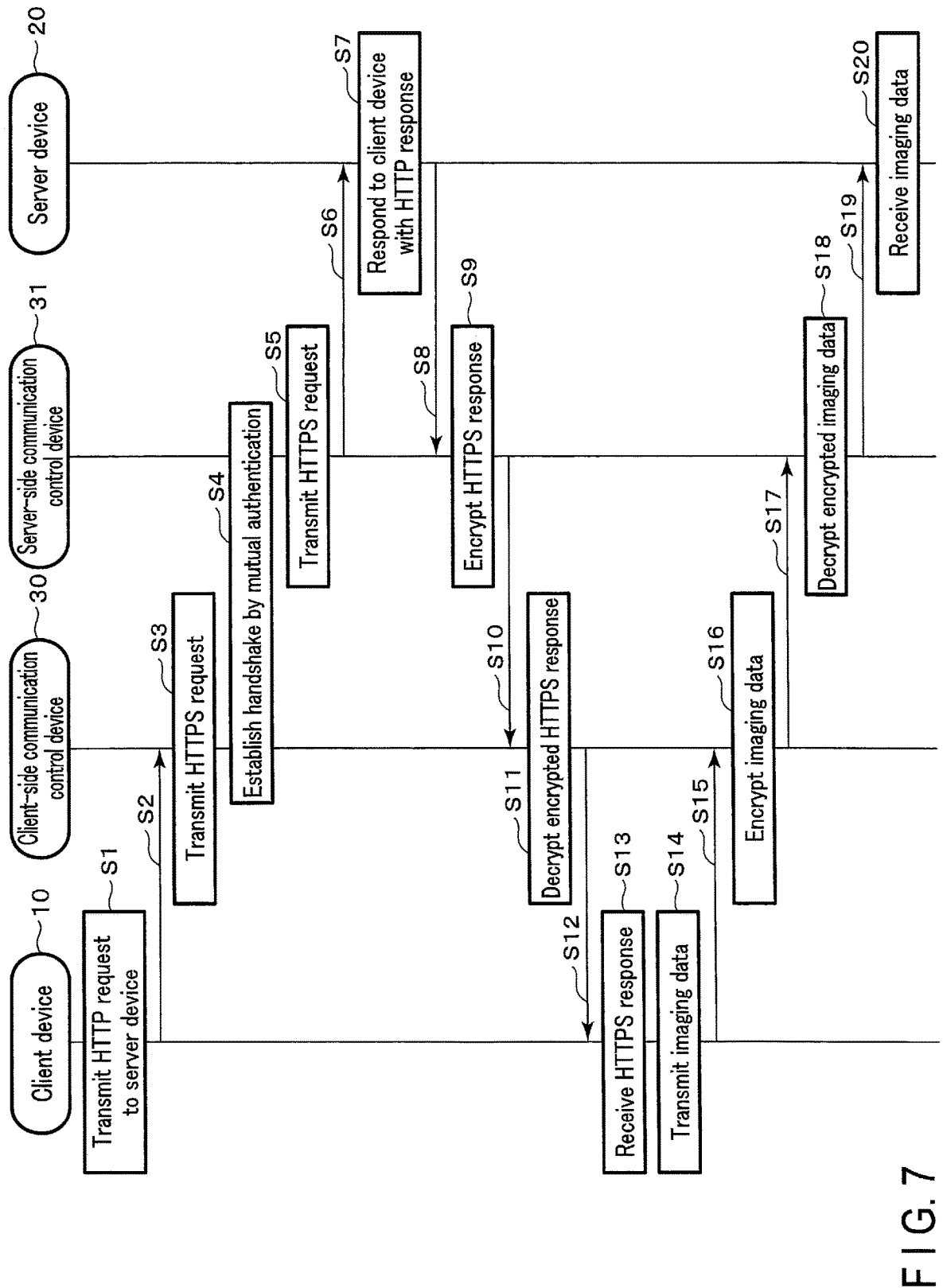
FIG. 7 is a sequence chart showing an example of a process to be performed by the communication system shown in FIG. 1.

FIG. 7 is a sequence chart showing an example of a process to be performed by the communication system 1.

The client device 10 first transmits an HTTP request to the server device 20 when imaging data is to be transmitted to the server device 20 (step S1). The HTTP request transmitted by the client device 10 is acquired by the client-side communication control device 30 (step S2).

When the HTTP request transmitted by the client device 10 is acquired, the client-side communication control device 30 transmits an HTTPS request (ClientHello) to the server-side communication control device 31 (step S3). As a result, a handshake is started in communication between the client-side communication control device 30 and the server-side communication control device 31 (step S4).

Specifically, ClientHello transmitted by the client-side communication control device 30 includes, for example, information indicating a TLS version and a list of encryption schemes or algorithms used for communication. The server-side communication control device 31 transmits an HTTPS response (ServerHello) to the client-side communication control device 30 as a response to ClientHello. ServerHello transmitted by the server-side communication control device 31 includes, for example, information selected by the server device 20 among options presented in ClientHello. In other words, a specific encryption algorithm in communication is determined by the server-side communication control device 31 performing selection with respect to the presentation from the client-side communication control device 30.

Then, the server-side communication control device 31 transmits information necessary for the common key for use in encrypted communication. For example, information necessary for the common key includes information indicating the public key issued to the server device 20 and its certificate, and information for requesting the transmission of the public key of the client device 10 and its certificate. The client-side communication control device 30 transmits information necessary for the public key issued to its own device and its certificate and the common key for use in encrypted communication to the server-side communication control device 31.

For example, mutual authentication in communication between the client-side communication control device 30 and the server-side communication control device 31 is performed as follows. The client-side communication control device 30 generates a signature from ServerHello or the like received so far and transmits the signature to the server-side communication control device 31. The server-side communication control device 31 verifies the signature received from the client-side communication control device 30 on the basis of the certificate received from the client-side communication control device 30. If verification is successful, the server-side communication control device 31 determines that the certificate is definitely a certificate of the client-side communication control device 30. The server-side communication control device 31 generates a signature from ClientHello or the like received so far and transmits the signature to the client-side communication control device 30. The client-side communication control device 30 verifies the signature received from the server-side communication control device 31 based on the certificate received from the server-side communication control device 31. If the verification is successful, the client-side communication control device 30 determines that the certificate is definitely a certificate of the server-side communication control device 31.

When mutual authentication in communication between the client-side communication control device 30 and the server-side communication control device 31 is correctly performed, each of the client-side communication control device 30 and the server-side communication control device 31 generates and exchanges a common key for use in encryption.

When a common key and a certificate, which are transmitted from the server-side communication control device 31 and issued for the server device 20, are authorized by the client-side communication control device 30, and a common key and a certificate, which are transmitted from the client-side communication control device 30, are authorized by the server-side communication control device 31, the server-side communication control device 31 ends the handshake.

When the handshake with the client-side communication control device 30 is established, the server-side communication control device 31 transmits an HTTP request to the server device 20 (step S5). The HTTP request is an HTTP request transmitted from the client device 10 in step S1.

The HTTP request transmitted by the server-side communication control device 31 is received by the server device 20 (step S6). At this time, the server device 20 recognizes that an HTTP request has been transmitted from the client device 10. Thus, the server device 20 responds to the client device 10 with an HTTP response (step S7). The HTTP response transmitted by the server device 20 is acquired by the server-side communication control device 31 (step S8).

The server-side communication control device 31 encrypts the acquired HTTP response from the server device 20 using the common key determined in the handshake in step S4 (step S9). The HTTP response encrypted by the server-side communication control device 31 is received by the client-side communication control device 30 via the network NW (step S10). The client-side communication control device 30 decrypts the received HTTP response using the common key (step S11). The HTTP response decrypted by the client-side communication control device 30 is acquired by the client device 10 (step S12). The client device 10 receives the decrypted HTTP response (step S13). At this time, the client device 10 recognizes that an HTTP response has been transmitted from the server device 20. Thus, the client device 10 transmits imaging data to the server device 20 (step S14).

The imaging data transmitted by the client device 10 is acquired by the client-side communication control device 30 (step S15). The client-side communication control device 30 encrypts the imaging data transmitted by the client device 10 using a common key (step S16). The imaging data encrypted by the client-side communication control device 30 is received by the server-side communication control device 31 via the network NW (step S17).

The server-side communication control device 31 decrypts the received imaging data using the common key (step S18). The imaging data decrypted by the server-side communication control device 31 is acquired by the server device 20 (step S19). The server device 20 receives the decrypted imaging data (step S20). At this time, the server device 20 recognizes that the imaging data from the client device 10 has been received.

When the mutual authentication between the client-side communication control device 30 and the server-side communication control device 31 has not been correctly performed in step S4 of the above-described flowchart, the client-side communication control device 30 does not permit communication with the communication destination. Specifically, the client-side communication control device 30 does not output the information transmitted from the communication destination to the client device 10. This is because, when the mutual authentication has not been correctly performed, there is a possibility that the communication destination will be an unauthorized communication device pretending to be the server-side communication control device 31. In this case, for example, the client-side communication control device 30 may be configured to transmit a communication record when the mutual authentication has not been correctly performed to the communication control management device 5. Accordingly, the communication control management device 5 can acquire a communication record when the mutual authentication has not been correctly performed, and monitor abnormalities of a network by ascertaining a pattern or frequency of unauthorized communication with the client-side communication control device 30 under management.

The client-side communication control device 30 may be configured to determine whether or not to permit communication with the communication destination on the basis of a transmission destination list indicating information of communication equipment with which the client device 10 is permitted to perform communication instead of mutual authentication in the handshake performed in step S4 of the above-described flowchart. The information of communication equipment indicated in the transmission destination list is, for example, a uniform resource locator (URL). The control unit 33 of the client-side communication control device 30 permits communication with the communication destination when the URL of the communication destination is a URL registered in the transmission destination list and does not permit communication when the URL of the communication destination is not registered in the transmission destination list.

The control unit 33 may be configured to update the transmission destination list. For example, the control unit 33 causes a URL of a communication destination permitted to communicate with the client device 10 for a fixed period and a URL of a communication destination which is not permitted to communicate with the client device 10 to be stored. Then, for example, the control unit 33 updates the transmission destination list by re-registering a URL of a communication destination with which communication has been performed for a fixed period among the URLs registered in the transmission destination list and the like. Alternatively, the client-side communication control device 30 may be configured to transmit a communication destination URL for which communication is permitted for a fixed period and a communication destination URL for which no communication is permitted to the communication control management device 5. In this case, for example, the communication control management device 5 may be configured to update the transmission destination list on the basis of the communication destination URL that communicates with the client-side communication control device 30. By updating the transmission destination list in the communication control management device 5, communication equipment that communicates with the client-side communication control device 30 under the management of the communication control management device 5 can be collectively managed.

The client-side communication control device 30 may be configured to verify whether or not details of information (for example, an update program of firmware) transmitted to the client device 10 after the handshake performed in step S4 is established are correct. For example, when the update program of firmware of the client device 10 has been transmitted via the network NW, the control unit 33 of the client-side communication control device 30 performs verification using a key for verification (verification key). In this case, for example, the communication control management device 5 may be configured to transmit the verification key to each of the client-side communication control device 30 and the server-side communication control device 31.

For example, the server-side communication control device 31 generates a hash value from information (plain text) that is transmitted to the client device 10 and encrypts the generated hash value with a verification key. Then, the server-side communication control device 31 further encrypts the plain text and the encrypted hash value with a secret key and transmits an encryption result to the client device 10. The client-side communication control device 30 decrypts information using the common key and acquires the plain text and the encrypted hash value.

The client-side communication control device 30 generates a hash value from the acquired plain text and decrypts the encrypted hash value with the verification key. When the hash value generated from the plain text and the decrypted hash value are equal, the client-side communication control device 30 determines that the information transmitted to the client device 10 are correct details. In this case, the client-side communication control device 30 outputs the decrypted information (plain text) to the client device 10. On the other hand, when the hash value generated from the plain text and the decrypted hash value are not equal, the client-side communication control device 30 determines that there is a possibility that information transmitted to the client device 10 may be unauthorized information transmitted from an unauthorized communication device pretending to be the server device 20 or the server-side communication control device 31. In this case, the client-side communication control device 30 does not output the decrypted information (plain text) to the client device 10.

As a result, the client device 10 can receive only information verified to be verified correct details. Normally, the client device 10 generally determines whether or not details of the update program are correct when the firmware is updated. However, since the server-side communication control device 31, instead of the client device 10, verifies details of the information transmitted to the client device 10, it is possible to reduce the processing load of the client device 10.

As described above, the communication system 1 includes the client-side communication control device 30 connected between the client device 10 and the network NW and the server-side communication control device 31 connected between the server device 20 and the network NW. The client-side communication control device 30 encrypts information from the client device 10, transmits it to the server-side communication control device 31 via the network NW, decrypts information from the network NW (information from the server device 20 encrypted by the communication control device 31), and transmits it to the client device 10. The server-side communication control device 31 encrypts information from the server device 20, transmits it to the client-side communication control device 30 via the network NW, decrypts information from the network NW (information from the client device encrypted by the communication control device 30), and transmits it to the server device 20.

Accordingly, the communication system 1 can improve the security of the social infrastructure system without changing the social infrastructure system. This is because imaging data (so-called plain text) of an HTTP protocol transmitted from the client device 10 to the server device 20 is combined with, for example, the SSL/TLS protocol, by the client-side communication control device 30 and is replaced with imaging data of HTTPS in which security is improved. Further, the control data transmitted by the server device 20 to the client device 10 is encrypted, but is decrypted by the client-side communication control device 30 and received by the client device 10. Therefore, it is unnecessary to cause the client device 10 to perform a decryption process and an existing device can be used as it is without any change.

In the communication system 1, because the client-side communication control device 30 and the server-side communication control device 31 perform mutual authentication, security can be improved as compared with a case in which authentication is performed only in one direction. In general client terminals and a server device, an unspecified number of client terminals communicate with the server device; therefore, it is not practical to issue and continuously manage valid client certificates with respect to the unspecified number of client terminals. However, in the social infrastructure system or the like to which a communication system is applied, a relationship between the client device 10 and the server device 20 is clearly specified. Thus, the client-side communication control device 30 and the server-side communication control device 31 can perform mutual authentication, and security can be improved.

In general, in a client terminal that does not have a client certificate, an ID or a password issued by the server device may be required to be input for communicating with the server device. In such password authentication, a long-text string in which characters and numbers are combined may be required with respect to the password, or periodic password changes and the like may be required, to maintain security. However, when the number of passwords to be remembered increases, management may become troublesome and passwords may leak in a case in which passwords are left in memos or are recorded in a web browser or the like.

In contrast, in the communication system 1, the client-side communication control device 30 has a client certificate, so that mutual authentication can be reliably performed in communication with the server device 20. Therefore, password authentication becomes unnecessary. Thus, the effort and time for inputting a password and periodically changing and managing the password are eliminated and user convenience is improved. That is, security can be maintained without imposing a burden on the user.

When a client terminal that does not have a client certificate communicates with a server device on the basis of authentication of an ID or a password, anyone can communicate with the server device if the ID and the password can be correctly input. Therefore, it becomes possible to illegally hijack the client terminal and illegally access the server device. Thus, for example, there is a possibility that the function of the client terminal will be limited by the server device that has been illegally hijacked and that the terminal will be infected with ransomware for requesting a ransom for release.

In contrast, in the above-described communication system 1, the mutual authentication via the communication control device 30 (31) is performed between the client device 10 and the server device 20, so that the client device 10 and the server device 20 cannot be hijacked illegally. That is, in the communication system 1, a countermeasure against ransomware is also possible.

In addition, for example, when there is a terminal (also called a stray device) for which there is no manager within the network, the terminal may be used as an unauthorized terminal that performs an attack of malware or the like due to the unauthorized hijacking of the terminal. In contrast, in the above-described communication system 1, mutual authentication via the communication control device 30 (31) is performed between the client device 10 and the server device 20. Thereby, even when a terminal for which there is no manager inside the network NW has been illegally hijacked and used in an attack, it is possible to prevent infection with malware or the like.

In the communication system 1 described above, the server device 20 is connected to the server-side communication control device 31 and no authentication process is performed inside the server device 20. Therefore, it is not necessary to hold a certificate or the like inside the server device 20 and it becomes clear that the server device 20 connected to the server-side communication control device 31 is under the management of the communication control management device 5. However, when the server device 20 already has a functional unit corresponding to the server-side communication control device 31, the server-side communication control device 31 is not necessarily required to be physically connected between the server device 20 and the network NW. In this case, an authentication process is performed in communication with the client-side communication control device 30 by a functional unit corresponding to the server-side communication control device 31 originally provided in the server device 20.

In the communication system 1, the control unit 51 of the IC card 40 causes at least one of a mutual authentication process and an encryption/decryption process to be performed. Thus, the device cost of the communication control device 30 (31) can be reduced.

An example in which the IC card 40 attached to the communication control device 30 (31) performs at least one of a mutual authentication process and an encryption/decryption process in the communication system 1 has been described. However, in the communication system 1, the configuration for performing the mutual authentication and the encryption/decryption process is not limited to the IC card. It suffices to use a functional unit having a storage function for storing a secret key and a client certificate (or a server certificate) and a processing function for performing at least one of a mutual authentication process and an encryption/decryption process as the IC card 40 described above. For example, the IC card may be a SIM card equipped with an IC chip, or may not adopt a card form.

In the communication system 1, the IC card 40 of the client-side communication control device 30 is attached to the client-side communication control device 30 so that the IC card 40 can be attached to or detached from the client-side communication control device 30. Thus, in the communication system 1, because the IC card 40 and the client-side communication control device 30 can be separated, when either one is replaced, it is only necessary to replace the one device. For example, in a case where the IC card 40 and the client-side communication control device 30 are integrated, when a part corresponding to the IC card 40 is replaced, the entire client-side communication control device 30 must be replaced. However, as compared with this case, in the communication system 1, it is possible to reduce the maintenance cost when a specific part such as the IC card 40 included in the client-side communication control device 30 is replaced.

The communication system 1 further includes the communication control management device 5, and the communication control management device 5 transmits a secret key and a client certificate to be stored in the IC card 40 attached to the client-side communication control device 30 to the client-side communication control device 30, and transmits a secret key and a server certificate to be stored in the IC card 40 attached to the server-side communication control device 31 to the server-side communication control device 31. As a result, the communication system 1 can perform a handshake using the valid secret key and certificate issued by the communication control management device 5 to determine a common key, and can further improve the security of the social infrastructure system in addition to the effects described above.

The configuration of the communication system 1 is not limited to the example described above. For example, the communication control device 30 (31) may use a hardware security module (HSM) for implementing the function of the communication control device 30 (31) by hardware on the basis of the processing load. That is, the communication control device 30 (31) is not limited to the configuration in which the IC card is mounted as long as secure processing can be performed, and may be configured using an IC-chip or an IC-module capable of implementing the function of the communication control device 30 (31).

In the communication system 1, secure communication using the SSL/TLS protocol may be performed all the time or whether to perform communication using the SSL/TLS protocol may be selectable. Only the communication in one direction in the two-way communication between the client device 10 and the server device 20 may be set as communication using the SSL/TLS protocol. Secure communication using the SSL/TLS protocol may be performed all the time or whether to perform communication using the SSL/TLS protocol may be selectable.

By performing communication using the SSL/TLS protocol all the time, communication from a device different from the valid communication control device 30 (31) authenticated by the communication control device 30 (31) can be blocked. Thus, it is possible to prevent unauthorized access to the client device 10 or the server device 20 and infection of the client device 10 or the server device 20 with malware.

In the communication system 1, communication using the SSL/TLS protocol may be performed all the time and unauthorized access to the client device 10 or the server device 20 may be stored. In this case, a record of unauthorized access may be transmitted to the communication control management device 5. The communication control management device 5 can recognize the presence or absence of unauthorized access and can detect a sign stage and take a measure before a large-scale attack on the entire system is started.

In the communication system 1, the communication control device 30 (31) may periodically check whether or not a connection with the client device 10 or the server device 20 to which its own device is connected is maintained. In this case, information indicating the connection state may be transmitted to the communication control management device 5. In a case in which the information indicating the connection state cannot be received from the communication control device 30 (31) and the like, the communication control management device 5 determines that the communication control device 30 (31) is disconnected from the client device 10 or the server device 20 and invalidates the disconnected communication control device 30 (31). In this way, the communication control management device 5 prevents the disconnected communication control device 30 (31) from being connected to an unauthorized device and misused for evil purposes.

In the communication system 1, a chip with high tamper resistance called a secure element acquiring CC (common criteria/ISO 15408) authentication may be mounted on the IC card 40 attached to the communication control device 30 (31). By using this chip to store a certificate including a secret key and a public key, very high security can be maintained.

In the communication system 1, the program of the client device 10 may be configured to be updated from the server device 20, the communication control management device 5, or the like via the communication control device 30 (31). It is possible to securely update the function of the client device 10 by performing the update of a program (the update of firmware) via the communication control device 30 (31). When the firmware is transmitted from the server device 20 to the client device 10 as described above, for example, a signature of the server device 20 encrypted by the server-side communication control device 31 is assigned to the firmware transmitted from the server device 20. In this case, the client device 10 can determine that the transmitted firmware is definitely the firmware transmitted from the server device 20 by decrypting the signature by means of the client-side communication control device 30. As a result, even if unauthorized firmware is transmitted to the client device 10 from an unauthorized terminal that pretends to be the server device 20, it is possible to eliminate erroneous update based on unauthorized firmware with respect to the client device 10.

In addition, by performing communication via the communication control device 30 (31) as described above, the firmware can be securely updated from the server device 20, the communication control management device 5, or the like to the client device 10. Therefore, work cost can be reduced as compared with a case in which a worker physically moves to a place where each client device 10 is installed with respect to a plurality of client devices 10 and performs a firmware update operation.

In the communication system 1, the client device 10 may be started or stopped from the server device 20, the communication control management device 5, or the like via the communication control device 30 (31). By performing the start and stop (remote activation) via the communication control device 30 (31), the function of the client device 10 can be updated securely and secure remote control can be implemented.

Although an example in which the client device 10 and the server device 20 communicate by wire in the communication system 1 has been described, the present invention is not limited thereto. At least one of the client device 10 and the server device 20 may be a device that performs wireless communication via a wireless LAN or the like. For example, when the client device 10 communicates with the server device 20 by wireless communication, the client-side communication control device 30 has a wireless communication function, encrypts data transmitted by the client device 10, and transmits the encrypted data to the server device 20 by wireless communication.

Although an example in which the client-side communication control device 30 communicates with the server-side communication control device 31 in the communication system 1 has been described, the communication destination of the client-side communication control device 30 is not limited thereto. For example, the client-side communication control device 30-1 may communicate with the client-side communication control device 30-2. When a communication start signal has been received from the client-side communication control device 30-2, the client-side communication control device 30-1 first performs mutual authentication in communication with the client-side communication control device 30-2 and checks that the client-side communication control device 30-2 is an authorized communication terminal. When the mutual authentication has been correctly performed, the client-side communication control device 30-1 outputs information received from the client-side communication control device 30-2 to the client device 10. By attaching an authenticator to transmission data using encryption, it becomes possible to detect falsification of communication information and to identify a transmitter. Therefore, in the communication system 1, in the communication between the client-side communication control device 30 and the server-side communication control device 31 and in the communication between the client-side communication control devices 30, it is possible to ensure that "data that has not been falsified is received from the correct partner".

First Embodiment

Next, the communication system according to the first embodiment will be described.

FIG. 8 is a diagram showing a first configuration example of a communication system 100 according to the first embodiment. In the communication system 100 shown in FIG. 8, the communication control device 30 in the system configuration shown in FIG. 1 is replaced with a communication control device 101. In the configuration example shown in FIG. 8, the communication control device 101 includes a plurality of communication devices 111A and 111B provided in parallel between the network NW and the client device 10.

In the configuration shown in FIG. 8, each device other than the communication control device 101 in the communication system 100 can be implemented by the same configurations as those in the device shown in FIG. 1. Therefore, detailed descriptions of the configurations other than the communication control device 101 will be omitted below.

In the communication system 100, the communication control device 31 may include a plurality of communication devices provided in parallel between the network NW and the server device 20, similarly to the communication control device 101.

Figure 9:
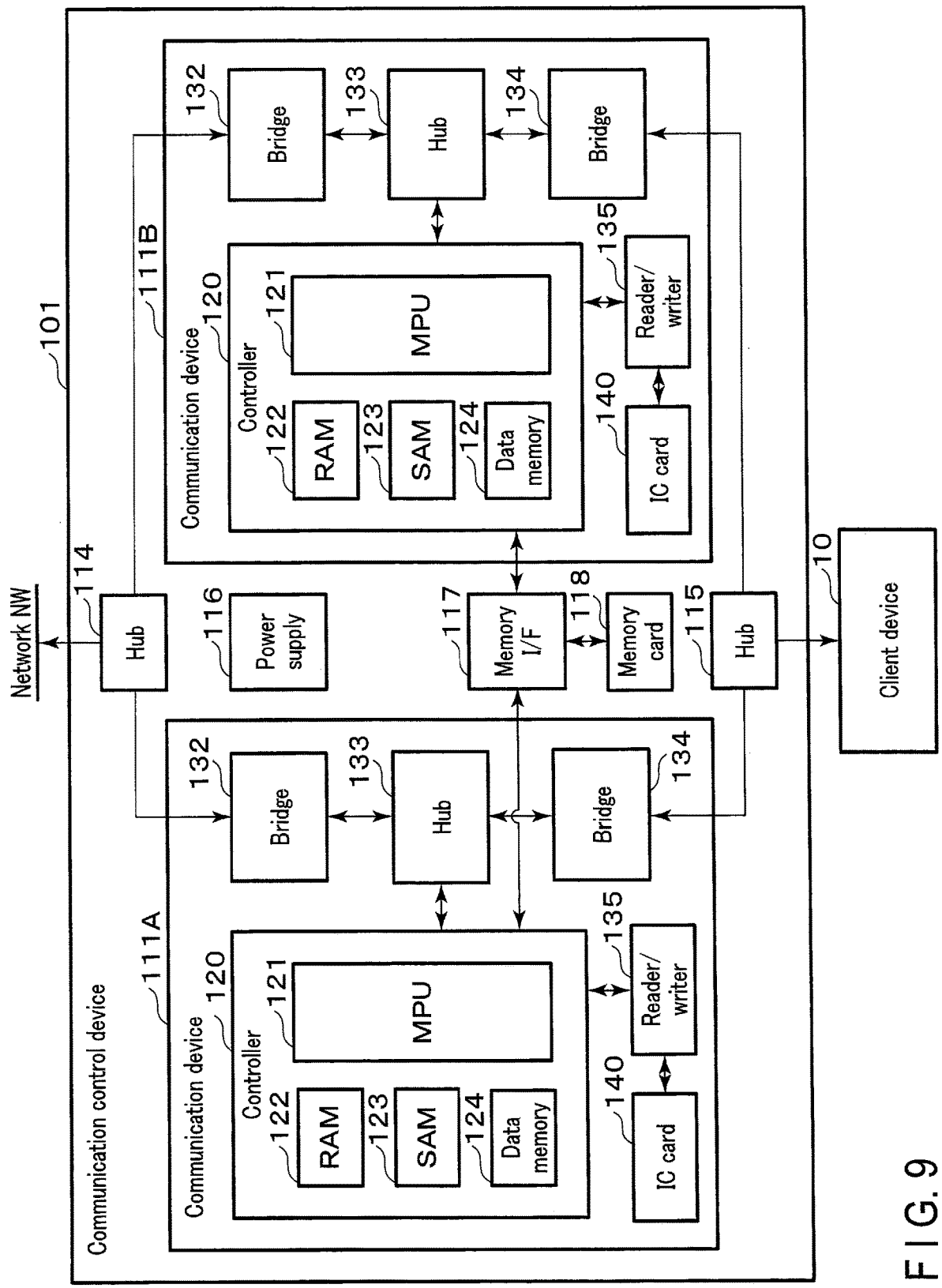
FIG. 9 is a block diagram showing a configuration example of the communication control device in the first configuration example of the communication system according to the first embodiment.

FIG. 9 is a block diagram showing a configuration example of the communication control device 101 in the first configuration example of the communication system 100 according to the first embodiment.

In the configuration example shown in FIG. 9, the communication control device 101 includes a first communication device 111A and a second communication device 111B arranged in parallel as a plurality of communication devices 111. The first communication device 111A and the second communication device 111B are connected in parallel between a hub 114 connected to the network NW side and a hub 115 connected to the client side in the communication control device 101. Each of the first communication device 111A and the second communication device 111B is configured to execute communication processing equivalent to that executed by the communication control device 30 shown in FIG. 1 described above.

In the configuration example shown in FIG. 9, it is assumed that the communication control device 101 includes a power supply 116 and a memory I/F 117 shared by the first communication device 111A and the second communication device 111B. The power supply 116 is connected to an external power supply and supplies power from the external power supply to the communication devices 111A and 111B. The memory I/F 117 is an interface for setting a memory device 118 such as a memory card. For example, the memory device 118 storing information to be applied to the communication devices 111A and 111B such as initial setting information is set to the memory I/F 117. The memory device 118 set to the memory I/F 117 may store data (for example, log data) supplied from the communication devices 111A and 111B.

However, the communication control device 101 according to the first embodiment may be implemented as a system in which a plurality of communication devices having the same configuration as the communication control device 30 are arranged in parallel. In such a system, each communication device may include a power supply, a memory I/F, etc. In the communication control device 101, it suffices that the first communication device 111A and the second communication device 111B are arranged in parallel between the network NW and the client device 10. For example, the communication control device 101 may have a configuration in which the hubs 114 and 115 are not provided and the first communication device 111A and the second communication device 111B each include an interface connected to the network NW and the client device 10.

In each communication control device 101, the first communication device 111A and the second communication device 111B are arranged in parallel between the network NW and the client device 10, and either one of them executes communication processing in a normal communication mode (first communication mode). The communication control device 101 realizes communication control between the network NW and the client device 10 by switching the communication devices 111A and 111B that communicate in the normal communication mode.

Here, it is assumed that the normal communication mode is an operation mode for performing communication involving encryption and decryption of transmission and reception data using a common key based on mutual authentication with the server-side communication control device 31 as described above. In the present embodiment, it is assumed that the communication control device 101 executes communication in a white list operation mode in which communication with a destination in a white list described later is permitted in the normal communication mode.

The first communication device 111A and the second communication device 111B provided in parallel in the communication control device 101 may be implemented by two pieces of communication processing software independent of each other. In this case, as hardware, one communication device may be operated as two communication devices arranged in parallel to be implemented by two pieces of software.

Each communication device 111 (first communication device 111A and 111B) has a function of detecting its own trouble, unauthorized access, malware infection, or the like. For example, the communication device 111 transmits, to the communication control management device (device management server) 5, information indicative of a problem, such as a trouble, a failure indicating unauthorized access, malware infection, or a communication failure. Each communication device 111 switches the operation mode according to an instruction from the communication control management device 5. For example, each communication device 111 switches from a non-communication state to the normal communication mode, or from the normal communication mode to the non-communication state, in response to an instruction from the communication control management device 5.

As shown in FIG. 9, each of the communication devices 111 (111A and 111B) includes a controller 120, a bridge 132, a hub 133, a bridge 134, a reader/writer 135, and an IC card 140.

The controller 120 controls the communication device 111. In the configuration example shown in FIG. 9, the controller 120 includes an MPU 121, a RAM 122, a SAM 123, a data memory 124, and the like.

The MPU 121 is an example of a processor that controls the controller 120. The MPU 121 implements various processes by executing a program stored in the data memory 124 or the like. For example, through execution of the program by the MPU 121, the controller 120 executes processes such as communication control, trouble detection, communication failure detection, self-diagnosis, and log information collection.

In addition, through execution of the program by the MPU 121, the controller 120 may perform a mutual authentication process with the server-side communication control device 31, an encryption process of data to be transmitted from the client device 10 to the network NW, a decryption process of encrypted data to be transmitted to the client device 10 via the network NW, and the like. The controller 120 may request at least one of the mutual authentication process, the encryption process, and the decryption process to the IC card 140 connected via the reader/writer 135.

The RAM 122 is a random access memory. The RAM 122 functions as a working memory for holding working data. The SAM 123 is a serial access memory. The data memory 124 is a rewritable nonvolatile memory.

The data memory 124 stores a program, setting information, and the like. For example, the data memory 124 stores a white list indicating a list of destinations to which communication is permitted. When the communication mode is a white list operation mode (normal communication mode, first communication mode) in which communication with a destination in the white list is performed, the controller 120 executes communication with reference to the white list stored in the data memory 124. The controller 120 may rewrite the white list in the data memory 124 in response to an instruction from the communication control management device 5. For example, the communication device 111 may be brought to the non-communication state by deleting all destinations in the white list. The data memory 124 may store log information indicating the operation state of the communication device. The log information accumulated in the data memory 124 is sent to the communication control management device (device management server) 5 or used for a self-diagnosis process or the like.

The bridges 132 and 134 function as communication interfaces (communication unit). The bridges 132 and 134 are connected to the controller 120 via the hub 133.

The bridge 132 executes communication on the network NW side in the communication device 111. The bridge 132 realizes communication as the NW communication unit 32 shown in FIG. 3. The bridge 132 supplies data received from the network NW to the controller 120 via the hub 133. The bridge 134 transmits data encrypted by the controller 120 or the IC card 140 to the network NW.

The bridge 134 executes communication on the client device 10 side in the communication device 111. The bridge 134 realizes communication as the device communication unit 34 shown in FIG. 3. The bridge 134 supplies data from the client device 10 to the controller 120 via the hub 133. For example, the bridge 134 decrypts encrypted data from the network NW through the controller 110 or the IC card 140, and transmits the decrypted data to the client device 10.

The reader/writer 135 and the IC card 140 correspond to the reader/writer 35 and the IC card 40 shown in FIG. 3 described above. The IC card 140 can be realized by the configuration of the IC card 40 shown in FIG. 4 described above. The IC card 140 has the same processing function as the IC card 40 shown in FIG. 5 described above, and functions as an example of an authentication unit in the communication control device 101.

Next, a first operation example in the communication system 100 having the configuration shown in FIG. 8 according to the first embodiment will be described.

Figure 10:
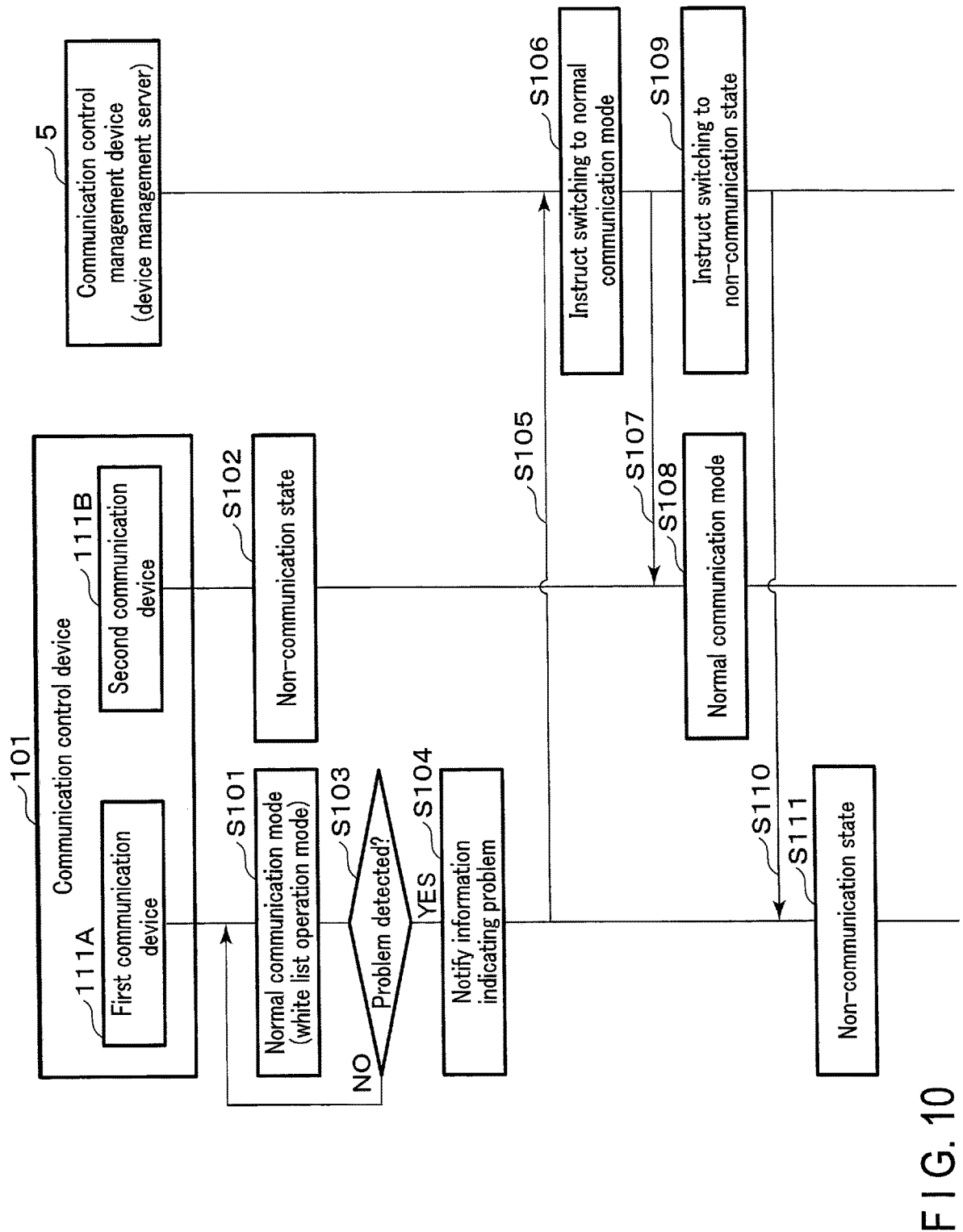
FIG. 10 is a sequence chart for explaining an operation example of the communication system according to the first configuration example of the first embodiment.

FIG. 10 is a sequence chart for explaining an operation example in the communication system 100 having the configuration shown in FIG. 8.

First, in the communication control device 101, it is assumed that the first communication device 111A performs communication in a normal operation mode (normal communication mode, first communication mode) based on the white list (step S101), and the second communication device 111B is in the non-communication state (step S102).

In the normal communication mode, the controller 120 in the first communication device 111A monitors the operation state such as the amount of communication data, the communication speed, the communication time, and the error detection frequency, and detects the presence or absence of a trouble in the first communication device or a communication failure (step S103). In addition, the controller 120 may detect the presence or absence of a problem in the communication device 111A by executing a self-diagnosis at a set timing. Alternatively, each communication device 111 may be provided with a detector for detecting a problem, and the controller 120 may obtain a detection result of the detector.

If the controller 120 of the first communication device 111A does not detect a problem (step S103, NO), the controller 120 continuously executes communication in the normal communication mode. If the controller 120 of the first communication device 111A detects a problem while communication is being executed in the normal communication mode (step S103, YES), the controller 120 transmits information indicating the problem to the communication control management device 5.

The information indicating the problem transmitted by the first communication device 111A of the communication control device 101 is acquired by the communication control management device 5 (step S105). The control unit 61 of the communication control management device 5 controls the second communication device 111B of the communication control device 101 so that it is in the normal communication mode, and the first communication device 111A so that it is in the non-communication state according to the information indicating the problem from the first communication device 111A of the communication control device 101.

That is, upon receipt of the information indicating the problem from the first communication device 111A, the control unit 61 of the communication control management device 5 instructs the second communication device 111B of the communication control device 101, which is the transmission source of the information indicating the problem, to switch to the normal communication mode (step S106). The instruction to switch to the normal communication mode from the communication control management device 5 is acquired by the second communication device 111B of the communication control device 101, which is the source of the information indicating the problem (step S107). Accordingly, the controller 120 of the second communication device 111B switches the operation mode to the normal communication mode in response to the instruction to switch to the normal communication mode from the communication control management device 5 (step S108).

In addition, upon receipt of the information indicating the problem from the first communication device 111A, the control unit 61 of the communication control management device 5 instructs the first communication device 111A of the communication control device 101, which is the transmission source of the information indicating the problem, to be in the non-communication state (step S109). The instruction to switch to the non-communication state from the communication control management device 5 is acquired by the first communication device 111A, which is the source of the information indicating the problem (step S110). Accordingly, the controller 120 of the first communication device 111A switches the operation mode to the non-communication state in response to the instruction to switch to the non-communication state from the communication control management device 5 (step S111).

Here, the operation modes of the first and second communication devices are switched so as not to interrupt communication as the communication control device 101. For example, the communication control management device (device management server) 5 sets the first communication device 111A to the non-communication state after the switching to the normal communication mode in the second communication device 111B is completed. Thus, the communication control management device 5 can reliably ensure the availability of communication in the communication control device 101.

In the communication control device 101, when a problem occurs in one of the communication devices executing communication in the normal communication mode, a switch control for executing communication in the normal communication mode by the other communication device may be implemented in the communication control device 101. For example, when the first communication device executing communication in the normal communication mode detects a problem, the controller 120 of the first communication device 111A may request the second communication device 111B to switch to the normal communication mode. Accordingly, the second communication device 111B can be activated in the normal communication mode in response to the request, and the first communication device 111A can be shifted to the non-communication state. In this case, the first communication device and the second communication device can communicate with each other by using their respective addresses.

Next, a second configuration example of the communication system according to the first embodiment will be described.

Figure 11:
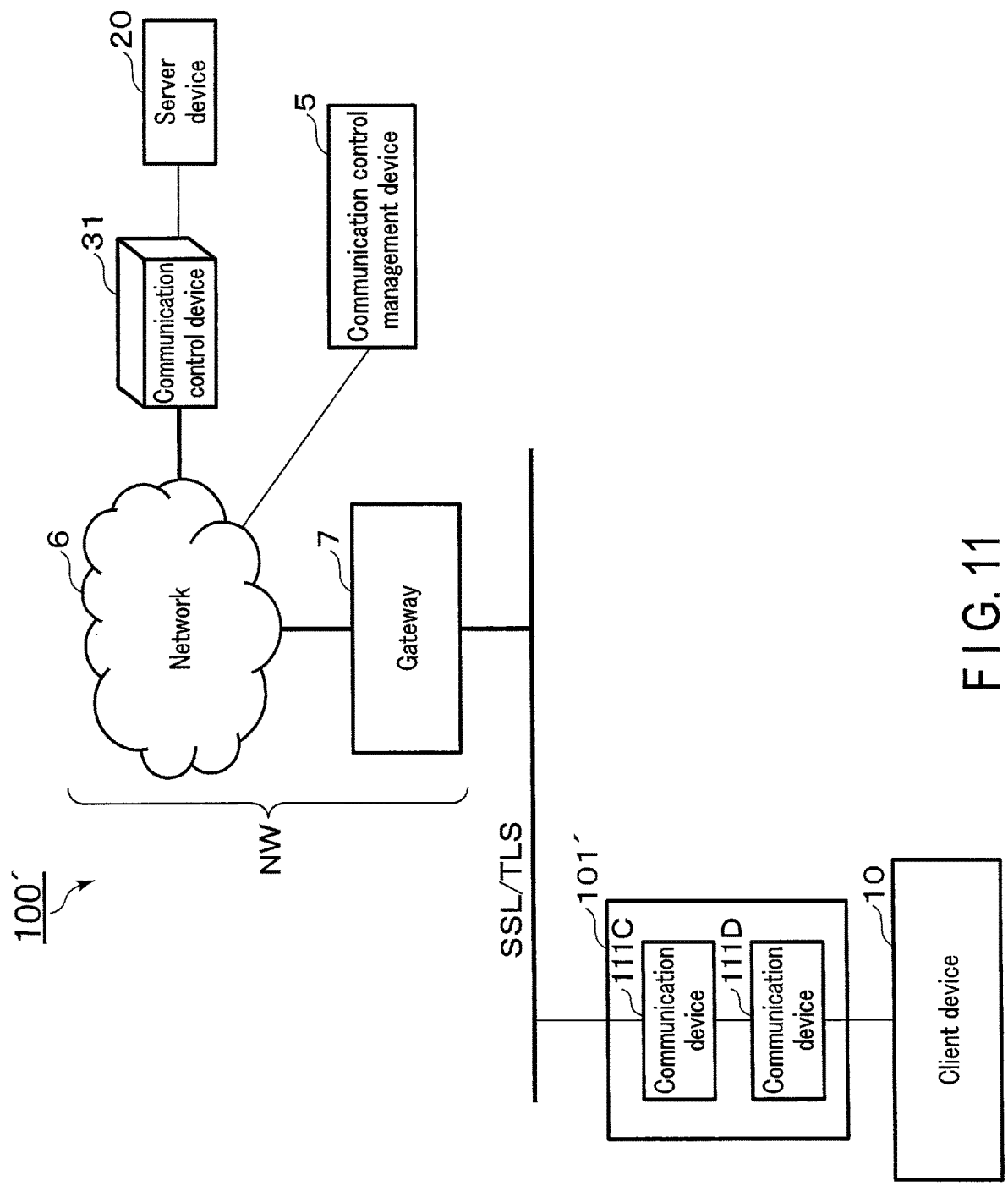
FIG. 11 is a diagram showing a second configuration example of the communication system according to the first embodiment.

FIG. 11 is a diagram showing a second configuration example of the communication system 100' according to the first embodiment. In the communication system 100' shown in FIG. 11, the communication control device 30 in the system configuration shown in FIG. 1 is replaced with a communication control device 101'. In the configuration example shown in FIG. 11, the communication control device 101' includes a plurality of communication devices 111C and 111D arranged in series between the network NW and the client device 10.

In the configuration shown in FIG. 11, each device other than the communication control device 101' in the communication system 100' can be implemented by the same configurations as those in the device shown in FIG. 1. Therefore, detailed descriptions of the configurations of the devices other than the communication control device 101' will be omitted below.

In the communication system 100', the communication control device 31 may include a plurality of communication devices arranged in series between the network NW and the server device 20, similarly to the communication control device 101'.

FIG. 12 is a block diagram showing a configuration example of the communication control device 101' in the second configuration example of the communication system 100' according to the first embodiment.

In the configuration example shown in FIG. 12, the communication control device 101' includes a first communication device 111C and a second communication device 111D arranged in series as a plurality of communication devices ill. In the example shown in FIG. 12, in the communication control device 101', the first communication device 111C connected to the network NW and the second communication device 111D connected to the client device 10 are connected in series.

In the configuration example shown in FIG. 12, it is assumed that the communication control device 101' includes a power supply 116 and a memory I/F 117 shared by the first communication device 111C and the second communication device 111D. Similarly to FIG. 9, the power supply 116 is connected to an external power supply and supplies power from the external power supply to the communication devices 111C and 111D. Furthermore, similarly to FIG. 9, the memory I/F 117 is an interface for setting a memory device 118 such as a memory card.

However, the communication control device 101' may be implemented as a system in which a plurality of communication devices having the same configuration as the communication control device 30 are arranged in series. In such a system, each of the plurality of communication devices 111' may include components such as a power supply and a memory I/F.

Each of the first communication device 111C and the second communication device 111D is configured to execute communication processing equivalent to that executed by the communication control device 30 shown in FIG. 1 described above. That is, in each communication control device 101, one of the first communication device 111C and the second communication device 111D arranged in series between the network NW and the client device 10 performs communication in the normal communication mode (first communication mode), and the other performs communication in a pass-through mode (second communication mode).

Here, the pass-through mode (second communication mode) is a communication mode in which input information is passed and output as it is. It is assumed that the normal communication mode is an operation mode for performing communication involving encryption and decryption of transmission and reception data using a common key based on mutual authentication with the server-side communication control device 31 as described above. In the present embodiment, it is assumed that the communication control device 101' executes communication in the white list operation mode, in which communication with a destination on the white list as described above is permitted in the normal operation mode.

The first communication device 111C and the second communication device 111D provided in series in the communication control device 101' may be implemented by two pieces of communication processing software independent of each other. In this case, as hardware, one communication device may be operated as two communication devices arranged in parallel to be implemented by two pieces of software.

Each communication device 111' (first communication device 111C and 111D) has a function of detecting its own trouble, unauthorized access, malware infection, or the like. For example, the communication device ill notifies the communication control management device (device management server) 5 of information indicative of a problem, such as a trouble, a failure indicating unauthorized access, malware infection, or a communication failure. Each communication device 111' switches the operation mode according to an instruction from the communication control management device 5. For example, each communication device 111' switches from the pass-through mode to the normal communication mode, or from the normal communication mode to the pass-through mode, in response to an instruction from the communication control management device 5.

As shown in FIG. 12, it is assumed that each of the communication devices 111' (111C and 111D) includes a controller 120, a bridge 132, a hub 133, a bridge 134, a reader/writer 135, an IC card 140, and the like, similarly to the configuration shown in FIG. 9. Furthermore, it is assumed that the controller 120 includes an MPU 121, a RAM 122, a SAM 123, a data memory 124, and the like. Since these components can be implemented by the same components as those shown in FIG. 9, detailed descriptions thereof will be omitted.

Next, an operation example (a second operation example) in the communication system 100' having the configuration shown in FIG. 11 according to the first embodiment will be described.

Figure 13:
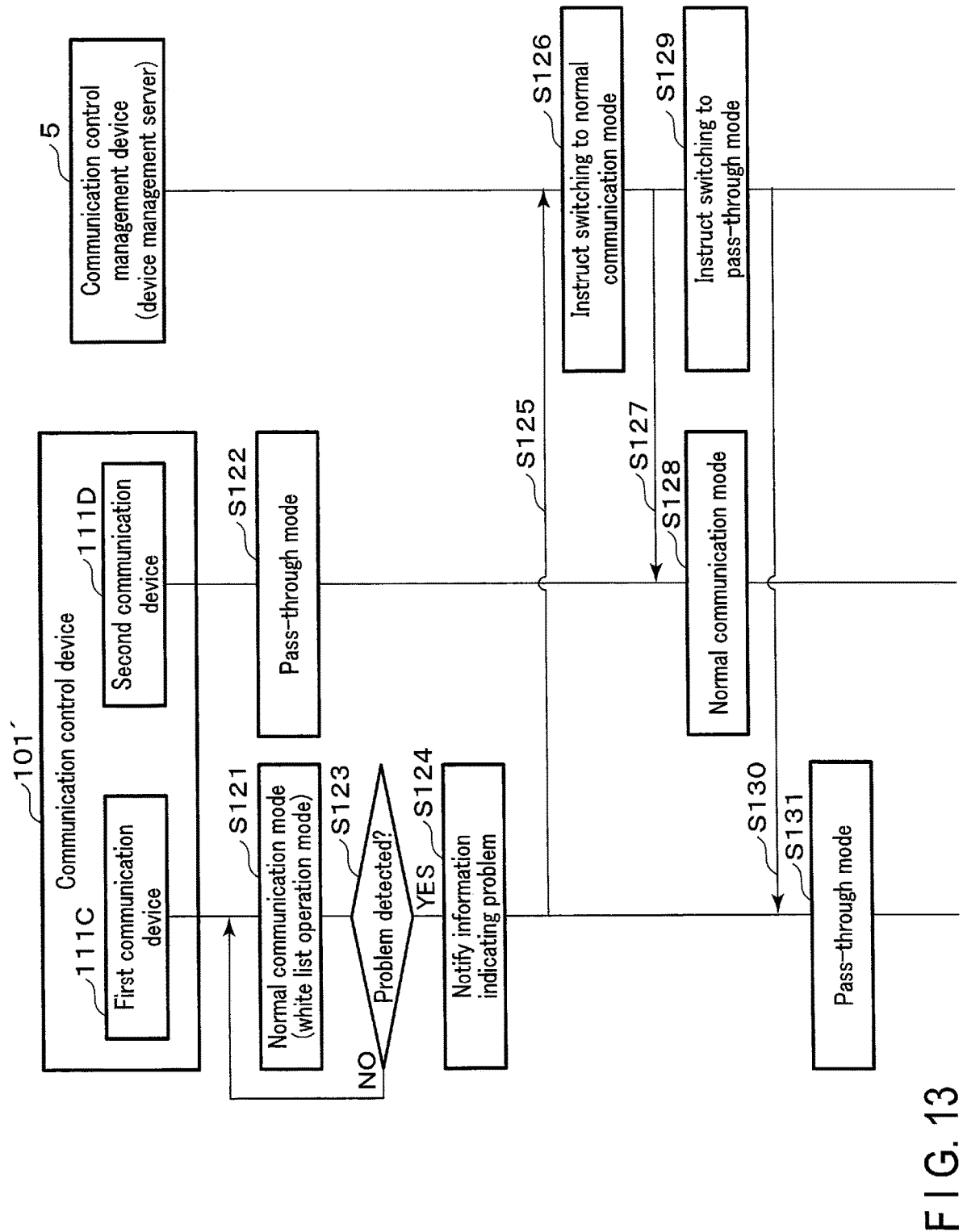
FIG. 13 is a sequence chart for explaining an operation example of the communication system according to the second configuration example of the first embodiment.

FIG. 13 is a sequence chart for explaining an operation example in the communication system 100' having the configuration shown in FIG. 11.

First, in the communication control device 101', it is assumed that the first communication device 111C performs communication in a normal operation mode (normal communication mode) based on the white list (step S121), and the second communication device 111D operates in the pass-through mode (step S122).

In the normal communication mode, the controller 120 in the first communication device 111C monitors the operation state such as the amount of communication data, the communication speed, the communication time, and the error detection frequency, and detects the presence or absence of a trouble in the first communication device or a communication failure (step S123). In addition, the controller 120 may detect the presence or absence of a problem in the communication device 111A by executing a self-diagnosis at a set timing. Alternatively, each communication device ill may be provided with a detector for detecting a problem, and the controller 120 may obtain a detection result of the detector.

If the controller 120 of the first communication device 111C does not detect a problem (step S123, NO), the controller 120 continuously executes communication in the normal communication mode. If the controller 120 of the first communication device 111C detects a problem while communication is being executed in the normal communication mode (step S123, YES), the controller 120 notifies the communication control management device 5 of information indicating the problem (step S124).

The information indicating the problem notified by the first communication device 111C of the communication control device 101' is acquired by the communication control management device 5 (step S125). The control unit 61 of the communication control management device 5 controls the second communication device 111D of the communication control device 101' so that it is in the normal communication mode, and the first communication device 111C so that it is in the pass-through mode according to the information indicating the problem from the first communication device 111C of the communication control device 101'.

That is, upon receipt of the information indicating the problem from the first communication device 111C, the control unit 61 of the communication control management device 5 instructs the second communication device 111D of the communication control device 101', which is the transmission source of the information indicating the problem, to switch to the normal communication mode (step S126). The instruction to switch to the normal communication mode from the communication control management device 5 is acquired by the second communication device 111D of the communication control device 101', which is the source of the information indicating the problem (step S127). Accordingly, the controller 120 of the second communication device 111D switches the operation mode to the normal communication mode in response to the instruction to switch to the normal communication mode from the communication control management device 5 (step S128).

In addition, upon receipt of the information indicating the problem from the first communication device 111C, the control unit 61 of the communication control management device 5 instructs the first communication device 111C of the communication control device 101', which is the transmission source of the information indicating the problem, to be in the pass-through mode (step S129). The instruction to switch to the pass-through mode from the communication control management device 5 is acquired by the first communication device 111C, which is the source of the information indicating the problem (step S130). Accordingly, the controller 120 of the first communication device 111C switches the operation mode to the pass-through mode in response to the instruction to switch to the pass-through mode from the communication control management device 5 (step S131).

According to the communication system of the first embodiment as described above, the communication control device has a redundant configuration in which a plurality of communication devices are provided. As a result, according to the first embodiment, it is possible to realize a communication operation of such reliable availability as to enable communication to be continued without interruption even if a trouble or a communication failure occurs in the communication control device ensuring data communication security via the network.

Second Embodiment

Next, a communication system according to the second embodiment will be described.

Figure 14:
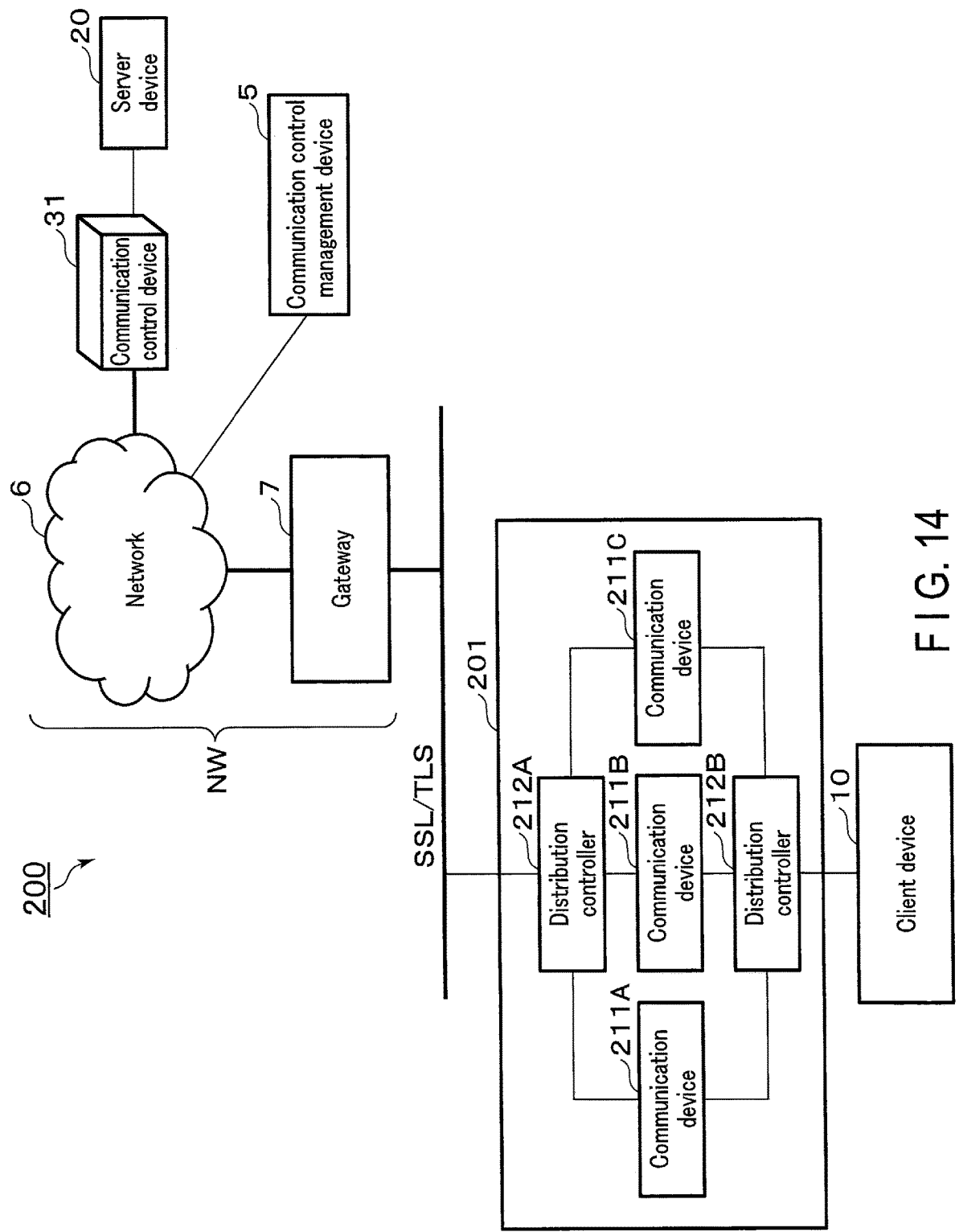
FIG. 14 is a diagram showing a configuration example of a communication system according to a second embodiment.

FIG. 14 is a diagram showing a configuration example of a communication system 200 according to the second embodiment. In the communication system 200 shown in FIG. 14, the client-side communication control device 30 in the system configuration shown in FIG. 1 is replaced with a communication control device 201. In the configuration example shown in FIG. 14, the communication control device 201 includes a plurality of communication devices 211A, 211B, and 211C arranged in parallel between the network NW and the client device 10 via distribution controllers 212A and 212B.

In the configuration shown in FIG. 14, each device other than the communication control device 201 in the communication system 200 can be implemented by the same configurations as those in the device shown in FIG. 1. Therefore, detailed descriptions of the configurations other than the communication control device 200 will be omitted.

In the communication system 200, the server-side communication control device 31 may include a plurality of communication devices arranged in parallel between the network NW and the server device 20 via the distribution controllers, similarly to the communication control device 201.

Figure 15:
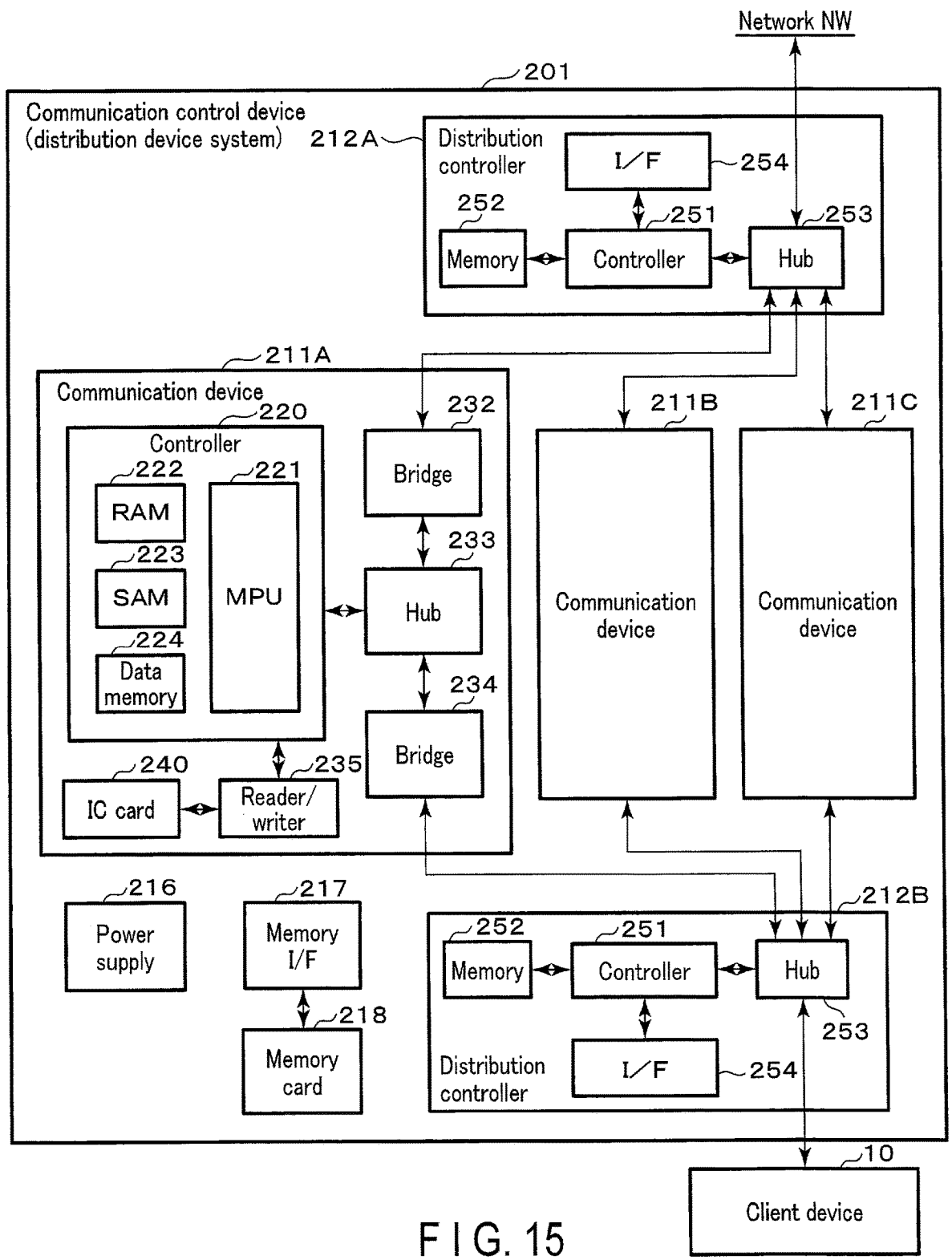
FIG. 15 is a block diagram showing a configuration example of a communication control device in the configuration example of the communication system according to the second embodiment.

FIG. 15 is a block diagram showing a configuration example of the communication control device 201 in the configuration example of the communication system 200 according to the second embodiment.

In the configuration example shown in FIG. 15, the communication control device 201 includes three communication devices 211A, 211B, and 211C arranged in parallel as a plurality of communication devices 211. The communication devices 211A to 211C are connected in parallel between the distribution controller 212A, connected to the network NW, and the distribution controller 212B, connected to the client device 10, in the communication control device 201. Each of the communication devices 211A to 211C is configured to execute communication processing equivalent to that executed by the communication control device 30 shown in FIG. 1 described above. In addition, the distribution controllers 212A and 212B perform control to distribute the processing load of communication to the communication devices 211A to 211C. Therefore, the controller included in each of the communication devices 211A to 211C can also perform the encryption/decryption process and the mutual authentication process using the certificate.

In the configuration example shown in FIG. 15, the communication control device 201 includes a power supply 216 shared by the communication devices 211A to 211C and the distribution controllers 212A and 212B. The communication control device 201 also includes a memory I/F 217 shared by the communication devices 211A to 211C. The power supply 216 is connected to an external power supply, and supplies power from the external power supply to the communication devices 211A to 211C and the distribution controllers 212A and 212B. The memory I/F 217 is an interface for setting a memory device 218 such as a memory card. For example, the memory device 218 storing setting information or the like for the respective communication devices 211 is set to the memory I/F 217.

In the communication control device 201 according to the second embodiment, the number of the communication devices 211 arranged in parallel is not limited to three, and may basically be two or more. In the communication control device 201, the communication devices 211 arranged in parallel may have different processing capacities as long as they perform communication processing of the same content. Furthermore, in the communication control device 201, the communication devices 211 arranged in parallel may be replaced with communication devices having different processing capacities.

Furthermore, the communication control device 201 according to the second embodiment may be implemented as a distribution device system in which a plurality of communication devices having the same configuration as the communication control device 30 are arranged in parallel between the two distribution controllers 212A and 212B. In this case, each of the communication devices constituting the distribution device system may include a power supply, a memory I/F, and the like, and may be configured as an independently operable device.

As shown in FIG. 15, each of the communication devices 211 (211A to 211C) includes a controller 220, a bridge 232, a hub 233, a bridge 234, a reader/writer 235, and an IC card 240.

The controller 220 controls the communication device 211. In the configuration example shown in FIG. 15, the controller 220 includes an MPU 221, a RAM 222, a SAM 223, a data memory 224, and the like.

The MPU 221 is an example of a processor that controls the controller 220. The MPU 221 implements various processes by executing a program stored in the data memory 224 or the like. For example, through execution of the program by the MPU 221, the controller 220 executes processes such as communication control, trouble detection, communication failure detection, monitoring of communication conditions, self-diagnosis, and log information collection.

In addition, through execution of the program by the MPU 221, the controller 220 may perform a mutual authentication process with the server-side communication control device 31, an encryption process of data to be transmitted from the client device 10 to the network NW, a decryption process of encrypted data to be transmitted to the client device 10 via the network NW, and the like. The controller 220 may request the IC card 240 to perform at least one of the mutual authentication process, the encryption process, and the decryption process.

The RAM 222 is a random access memory. The RAM 222 functions as a working memory for holding working data. The SAM 223 is a serial access memory. The data memory 224 is a rewritable nonvolatile memory.

The data memory 224 stores a program, setting information, and the like. For example, the data memory 224 stores a white list indicating a list of destinations to which communication is permitted. The controller 220 executes communication in the normal communication mode (first communication mode) with reference to the white list stored in the data memory 224. The data memory 224 may store log information indicating the operation state of the communication device. The data memory 224 may store information indicating the communication amount in the communication device. Further, the data memory 224 executes a self-diagnosis process by analyzing log data or the like.

The bridges 232 and 234 function as communication interfaces (communication unit). The bridges 232 and 234 are connected to the controller 220 via the hub 233.

The bridge 232 executes communication on the network NW side in the communication device 211. The bridge 232 realizes communication as the NW communication unit 32 shown in FIG. 3. The bridge 232 supplies data received from the network NW to the controller 220 via the hub 233. The bridge 234 transmits data encrypted by the controller 220 or the IC card 240 to the network NW.

The bridge 234 executes communication on the client device 10 side in the communication device 211. The bridge 234 realizes communication as the device communication unit 34 shown in FIG. 3. The bridge 234 supplies data from the client device 10 to the controller 220 via the hub 233. Further, the bridge 234 decrypts encrypted data from the network NW by the controller 220 or the IC card 240, and transmits the decrypted data to the client device 10.

The reader/writer 235 and the IC card 240 correspond to the reader/writer 35 and the IC card 40 shown in FIG. 3 described above. The IC card 240 can be realized by having the configuration of the IC card 40 shown in FIG. 4 described above. The IC card 240 has the same processing function as the IC card 40 shown in FIG. 5 described above, and functions as an example of an authentication unit in the communication control device 201.

As shown in FIG. 15, each of the distribution controllers 212 (212A and 212B) includes a controller 251, a memory 252, a hub 253, and an interface (I/F) 254.

The controller 251 controls the distribution controller 212. The controller 251 includes a processor and various types of memories. In the controller 251, various processes are implemented by the processor executing a program. For example, the controller 251 performs distribution control of communication loads on the respective communication devices 211A to 211C by the processor executing a program.

The memory 252 stores setting information and the like. For example, the memory 252 stores a threshold value or the like for determining the distribution of the communication load. The controller 251 determines a communication device to execute communication processing from a plurality of communication devices according to a communication load based on setting information such as a threshold value stored in the memory 252.

The hub 253 is an interface that connects the network NW or the client device 10 to the communication devices 211A to 211C. In the hub 253, a communication device to be connected is controlled by the controller 251.

The interface 254 is an interface for acquiring setting information and the like. In the case in which setting information such as a threshold value is acquired from the communication control management device (device management server) 5, the interface 254 is configured as a communication unit for communicating with the communication control management device 5. Further, the interface 254 may be configured by a memory reader that reads information from a memory device such as a memory card storing setting information such as a threshold value. The interface 254 may be an interface for connecting an external device that supplies setting information such as a threshold value.

Next, an operation example of the communication system 200 having the configuration shown in FIGS. 14 and 15 according to the second embodiment will be described.

Figure 16:
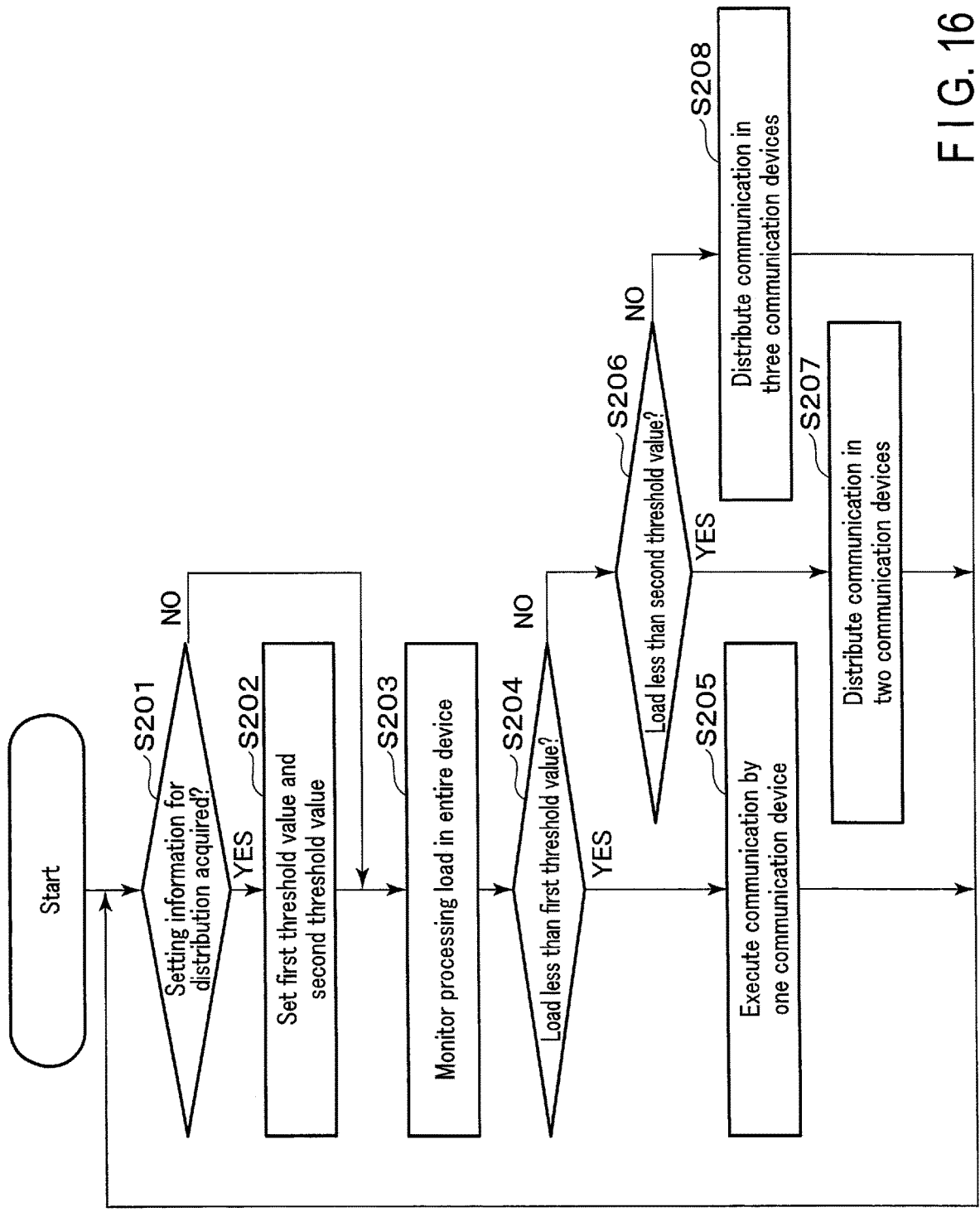
FIG. 16 is a flowchart for explaining an operation example of a distribution controller in the communication system according to the second embodiment.

FIG. 16 is a flowchart for explaining an operation example of the distribution controller 212 (212A, 212B) in the communication system 200 having the configuration shown in FIGS. 14 and 15.

First, the distribution controller 212 receives setting information for distribution processing by the communication devices 211A to 211C input by the interface 254 or the like (S201). If the setting information for the distribution processing is acquired (step S201, YES), the controller 251 of the distribution controller 212 (212A or 212B) sets a threshold value for determining the distribution processing by the communication devices 211A to 211C based on the input setting information (step S202). Here, it is assumed that three communication devices are arranged in parallel in one communication control device 201, and the controller 251 stores a first threshold value and a second threshold value in the memory 252.

For example, the first threshold value is a determination reference value with respect to the processing load in the entire communication control device 201 for determining whether or not to execute the communication processing by one communication device. The controller 251 of the distribution controller 212 executes the communication processing by one communication device when the processing load in the entire communication control device 201 is less than the first threshold value, and in a distributed manner by a plurality of communication devices when the processing load is equal to or greater than the first threshold value.

Further, the second threshold value is a determination reference value with respect to the processing load in the entire communication control device 201 for determining whether or not to execute the communication processing by the three communication devices. The controller 252 of the distribution controller 212 executes the communication processing in a distributed manner by three communication devices when the processing load in the entire communication control device 201 is greater than the second threshold value, and by two communication devices when the processing load is equal to or greater than the first threshold value and less than the second threshold value. The threshold values as the setting information for performing the distribution processing may be set as appropriate.

In addition, the controller 251 of the distribution controller 212A or 212B monitors the processing load in the communication devices based on the communication amount or the like (step S203). For example, since the communication device 211 executes a decryption process on information input from the network NW side, the controller 251 in the distribution controller 212A monitors the amount of data input from the network NW side as a processing load. Furthermore, since the communication device 211 executes an encryption process on information input from the client device 10, the controller 251 in the distribution controller 212B monitors the amount of data input from the client device 10 as a processing load.

If the processing load under monitored conditions is less than the first threshold value (step S204, YES), the controller 251 of the distribution controller 212 causes one of the communication devices 211 to execute the communication processing (step S205).

For example, in a state in which a plurality of communication devices are operating, the controller 251 executes communication using only one communication device when the processing load under monitored conditions is less than the first threshold value, and causes the communication devices that do not execute communication to be shifted to the non-communication state (sleep state).

Accordingly, when the processing load is less than the first threshold value, the distribution controller 212 can suppress wasteful power consumption by executing the communication processing with only one communication device and bringing the other communication devices into the non-communication state.

If the processing load under monitored conditions is equal to or greater than the first threshold value (step S204, NO), the controller 251 of the distribution controller 212 determines whether the processing load is less than the second threshold value (step S206). If the processing load is equal to or greater than the first threshold value and less than the second threshold value (step S206, YES), the controller 251 causes two communication devices to execute communication processing in a distributed manner (step S207).

For example, in a state in which only one of the communication devices 211A is operating, when the processing load under monitored conditions is equal to or greater than the first threshold value and less than the second threshold value, the controller 251 sets the second communication device 211B to a communicable state. When the communication device 211B as well as the communication device 211A becomes communicable, the controller 251 distributes information output from the hub 253 to the communication device 211A and the communication device 211B.

Accordingly, when the processing load is equal to or greater than the first threshold value and less than the second threshold value, the distribution controller 212 can cause the two communication devices to execute the processing in a distributed manner. As a result, the distribution controller 212 can execute the communication processing in a distributed manner by the plurality of communication devices operated according to the processing load, and can prevent occurrence of data delay or the like due to insufficient processing capacities.

If the processing load under monitored conditions is equal to or greater than the second threshold (step S206, NO), the controller 251 of the distribution controller 212 causes the three communication devices to execute communication processing in a distributed manner (step S208). For example, in a state in which the two communication devices 211A and 211B are operating, when the processing load under monitored conditions is equal to or greater than the second threshold value, the controller 251 sets the third communication device 211C to a communicable state. When the communication device 211C as well as the communication devices 211A and 211B becomes communicable, the controller 251 distributes the information output from the hub 253 to the communication devices 211A, 211B, and 211C.

Accordingly, when the processing load is equal to or greater than the second threshold value, the distribution controller 212 can cause the three communication devices (the maximum number of communication devices) to execute the processing in a distributed manner. As a result, the distribution controller 212 can execute the communication processing in a distributed manner by the plurality of communication devices operated according to the processing load, and can prevent occurrence of data delay or the like due to insufficient processing capacities.

Although the operation example has been described on the assumption that the plurality of communication devices operate normally, the distribution controller may detect a problem such as a trouble in each communication device or a communication failure and perform the control in a distributed manner as described above in a communication device other than the communication device in which the problem occurs. In addition, when a problem occurs in all the communication devices, the distribution controller may operate any one of the communication devices in the pass-through mode to reliably continue data communication.

In the communication control device described above, a plurality of equivalent communication devices are arranged in parallel, but a plurality of communication devices having different processing capacities may be arranged in parallel. Further, one communication device may be used as a main processing device, and the others as slave processing devices to assist the processing of the main communication device. Furthermore, the contents of processing performed by the communication device may be divided.

As described above, the communication system according to the second embodiment includes the communication control device in which a plurality of communication devices are arranged in parallel via the distribution controller between the network and the client device. The distribution controller monitors a processing load in the communication control device, then distributes and executes the communication processing by the number of communication devices corresponding to the processing load.

This makes it possible to reduce the probability of communication control device-caused data delay even when communicating data exceeding the maximum allowable communication capacity of one communication device. In addition, since control is performed so that communication is executed by the communication devices of the number corresponding to the processing load, it is possible to achieve power saving without activating a large number of communication devices in a state in which the load is small.

Third Embodiment

Next, a communication system according to a third embodiment will be described.

FIG. 17 is a diagram showing a configuration example of a communication system 300 and a communication control device 301 according to the third embodiment. In the communication system 300 shown in FIG. 17, the client-side communication control device 30 in the system configuration shown in FIG. 1 is replaced with the communication control device 301. However, in the communication system 300, the server-side communication control device 31 disposed between the network NW and the server device 20 may have the same configuration as the communication control device 301. In the configuration shown in FIG. 17, each device other than the communication control device 301 in the communication system 300 can be implemented by the same configurations as those in the device shown in FIG. 1, and detailed descriptions thereof will be omitted.

In the configuration example shown in FIG. 17, the communication control device 301 includes a power supply 316, a memory I/F 317, a controller 320, a bridge 332, a hub 333, a bridge 334, a reader/writer 335, an IC card 340, and the like.

The controller 320 controls the communication device 211. In the configuration example shown in FIG. 17, the controller 320 includes an MPU 321, a RAM 322, a SAM 323, a data memory 324, and the like.

The MPU 321 is an example of a processor that controls the controller 320. The MPU 321 implements various processes by executing a program stored in the data memory 324 or the like. For example, through execution of the program by the MPU 321, the controller 320 executes processes such as communication control, trouble detection, communication failure detection, communication amount analysis, self-diagnosis, log information storage, and log information transmission.

In addition, through execution of the program by the MPU 321, the controller 320 may perform a mutual authentication process with the server-side communication control device 31, an encryption process of data to be transmitted from the client device 10 to the network NW, a decryption process of encrypted data to be transmitted to the client device 10 via the network NW, and the like. The controller 320 may request the IC card 340 to perform at least one of the mutual authentication process, the encryption process, and the decryption process.

The RAM 322 is a random access memory. The RAM 322 functions as a working memory for holding working data. The SAM 323 is a serial access memory. The data memory 324 is a rewritable nonvolatile memory.

The data memory 324 stores a program, setting information, and the like. For example, the data memory 324 stores a white list indicating a list of destinations to which communication is permitted. The controller 320 executes communication in the normal communication mode (first communication mode) with reference to the white list stored in the data memory 324. The data memory 324 may store log information indicating the operation state of the communication control device. In addition, the data memory 324 stores analysis information of the communication amount in the communication control device by the controller 320.

The bridges 332 and 334 function as communication interfaces (communication unit). The bridges 332 and 334 are connected to the controller 320 via the hub 333.

The bridge 332 executes communication on the network NW side in the communication control device 301. The bridge 332 realizes communication as the NW communication unit 32 shown in FIG. 3. The bridge 332 supplies data received from the network NW to the controller 320 via the hub 333. The bridge 334 transmits data encrypted by the controller 320 or the IC card 340 to the network NW.

The bridge 334 executes communication on the client device 10 side in the communication control device 301. The bridge 334 realizes communication as the device communication unit 34 shown in FIG. 3. The bridge 334 supplies data from the client device 10 to the controller 320 via the hub 333. Further, the bridge 334 decrypts encrypted data from the network NW by the controller 320 or the IC card 340, and transmits the decrypted data to the client device 10.

The reader/writer 335 and the IC card 340 correspond to the reader/writer 35 and the IC card 40 shown in FIG. 3 described above. The IC card 340 can be realized by having the configuration of the IC card 40 shown in FIG. 4 described above. The IC card 340 has the same processing function as the IC card 40 shown in FIG. 5 described above, and functions as an example of an authentication unit in the communication control device 301.

The power supply 316 is connected to an external power supply, and supplies power from the external power supply to each unit in the communication control device 301. The memory I/F 317 is an interface for setting a memory device 318 such as a memory card. For example, the memory device 318 storing setting information or the like for the communication control device 301 is set to the memory I/F 317.

Next, an operation example of the communication system 300 having the configuration shown in FIG. 17 according to the third embodiment will be described.

Figure 18:
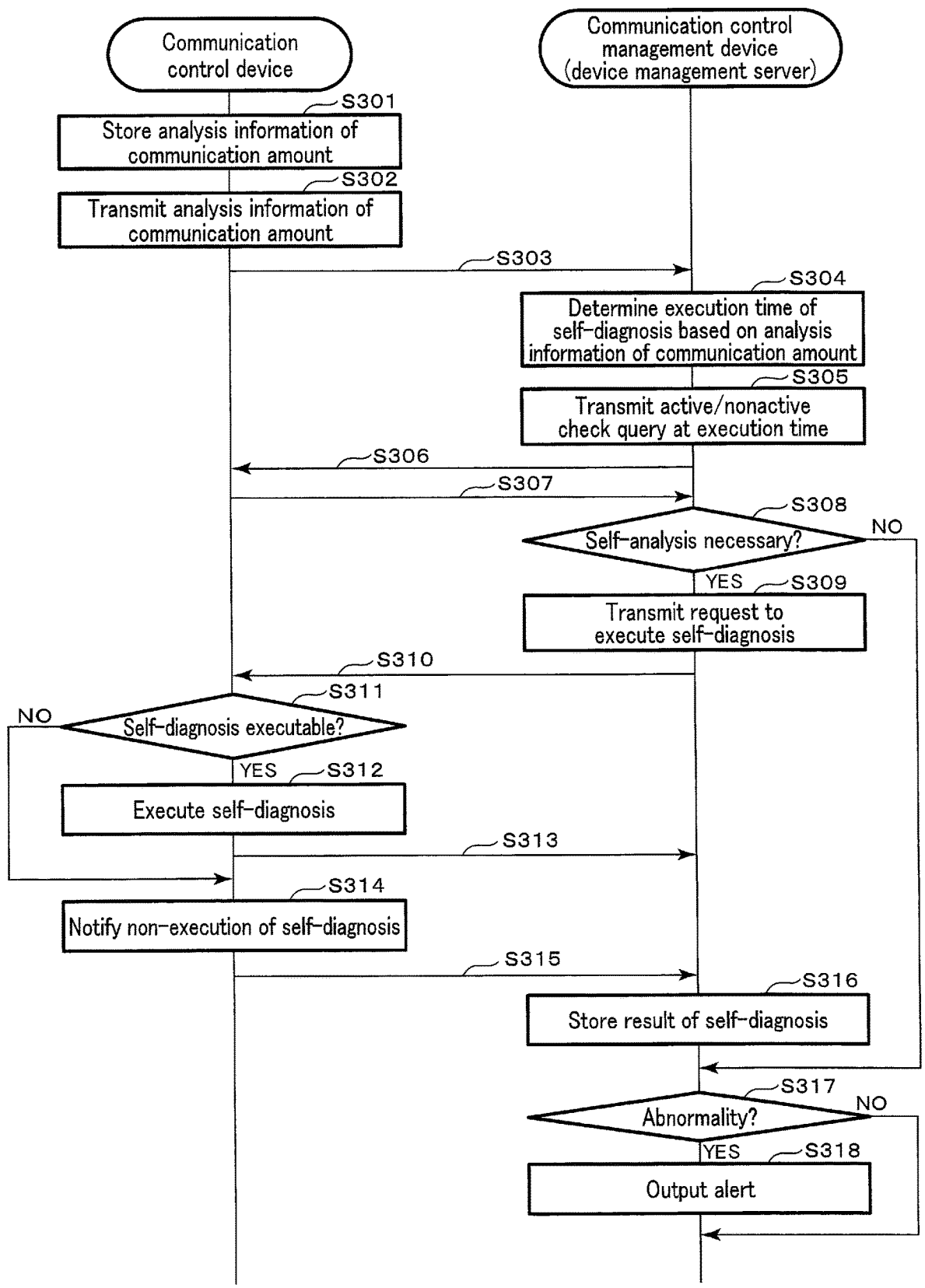
FIG. 18 is a sequence chart for explaining a first operation example of the communication system according to the third embodiment.

FIG. 18 is a sequence chart for explaining a first operation example in the communication system 300 shown in FIG. 17.

First, the communication control device 301 accumulates log information including a communication amount in normal operation. For example, the controller 320 of the communication control device 301 monitors data passing through the bridges 332 and 334 as communication interfaces, and thereby stores information indicating the communication amount of the communication control device 301 in the data memory 324.

The controller 320 in the communication control device 301 analyzes information indicating the communication amount accumulated as log information in the data memory 324, and stores the analysis information of the communication amount as an analysis result in the data memory 324 (step S301). For example, the controller 320 analyzes the communication amount at a predetermined cycle and records the analysis information of the communication amount in the data memory 324. The analysis information of the communication amount may be, for example, information indicating the communication amount per hour, information indicating the communication amount per time zone and an increase/decrease tendency of the communication amount, or information indicating a time zone in which the communication amount is less than a predetermined threshold value or a time zone in which the communication amount is at a minimum. In the third embodiment, the analysis information of the communication amount may be any information for determining the time at which the communication control device 301 performs self-diagnosis.

The controller 320 of the communication control device 301 transmits the analysis information of the communication amount stored in the data memory 324 to the communication control management device (device management server) 5 (step S302). For example, the controller 320 may transmit the analysis information of the communication amount at a predetermined timing, or may transmit the analysis information in response to a request from the communication control management device 5. In addition, the controller 320 may self-determine a time zone in which the communication amount in the communication control management device 5 is small, and transmit the analysis information of the communication amount to the communication control management device 5 in the time zone in which the communication amount is determined to be small.

The analysis information of the communication amount transmitted from the communication control device 301 is acquired by the communication control management device 5 (step S303). The control unit 61 of the communication control management device 5 stores the analysis information of the communication amount received by the NW communication unit 60 in the storage unit 66, in association with identification information indicating the communication control device 301 which is the transmission source. The control unit 61 determines a time or a time zone in which the communication control device 301 should execute self-diagnosis based on the received analysis information of the communication amount (step S304). For example, the control unit 301 specifies, as the execution time of the self-diagnosis (scheduled execution time), the time when an amount of time required for the self-diagnosis process can be secured in the time zone in which the communication amount is less than the predetermined threshold value based on the analysis information of the communication amount. In a situation where the communication amount is low for a long period of time, such as in the middle of the night, the time when an amount of time required for the self-diagnosis process can be secured may be specified as the execution time of the self-diagnosis (scheduled execution time), regardless of whether the communication amount is less than the predetermined threshold value.

After determining the execution time of the self-diagnosis, when the execution time of the self-diagnosis comes, the control unit 61 transmits an active/nonactive check query to the communication control device 301 (step S305). The active/nonactive check query requests a response indicating whether or not the operation is normally performed. Upon receipt of the active/nonactive check query from the communication control management device 5 (step S306), if the operation is normally performed, the controller 320 of the communication control device 301 transmits a response indicating that the operation is normal (step S307). The communication control device 301 may respond to the active/nonactive check query with the date and time when the previous self-diagnosis was performed.

The control unit 61 of the communication control management device 5 determines whether or not to perform self-diagnosis based on the response from the communication control device 301 (step S308). For example, when there is no response from the communication control device, or when a predetermined period or more has elapsed since the date and time when the previous self-diagnosis was executed, the control unit 61 determines that the communication control device 301 is to execute the self-diagnosis. The control unit 61 may execute self-diagnosis regardless of the response from the communication control device 301. If the self-diagnosis is to be executed, the control unit 61 of the communication control management device 5 requests the communication control device 301 to execute the self-diagnosis (step S309).

Upon receipt of the request to execute the self-diagnosis from the communication control management device 5, the controller 320 of the communication control management device 5 determines whether the self-diagnosis can be executed by itself (step S311). For example, the controller 320 executes self-diagnosis when the current communication amount is less than a predetermined threshold value.

This is because the execution time of the self-diagnosis designated by the communication control management device 5 is based on the past communication amount (analysis information of the communication amount), and there is a possibility that the communication amount is actually larger at the set time. The system according to the third embodiment controls the communication control device and the entire communication system so as to execute self-diagnosis with a minimum load. Therefore, the controller of the communication control device determines that the self-diagnosis is not to be executed (to be postponed) when the actual communication amount is larger.

If the self-diagnosis is to be executed (step S311, YES), the controller 320 executes the self-diagnosis (step S312), and transmits information indicating an execution result of the self-diagnosis to the communication control management device 5. In this case, the information indicating the execution result of the self-diagnosis is transmitted from the communication control device 301 and acquired by the communication control management device 5 (step S313).

If the self-diagnosis is not to be executed (step S311, NO), the controller 320 transmits a notification indicating that the self-diagnosis is not executed to the communication control management device 5 (step S314). In this case, a notification indicating that the self-diagnosis is not executed is acquired by the communication control management device 5 as a response to the request to execute the self-diagnosis (step S315).

Upon receipt of a result in reply to the request to execute the self-diagnosis, the control unit 61 of the communication control management device 5 stores the result of the self-diagnosis in the storage unit 66 (step S316). For example, if the self-diagnosis is executed in the communication control device 30, the control unit 61 stores information indicating the execution result of the self-diagnosis in the storage unit 66 in association with the identification information of the communication control device 301 together with the execution date and time. If the self-diagnosis is not executed in the communication control device 30, the control unit 61 stores information indicating that the self-diagnosis is not executed in the storage unit 66 in association with the identification information of the communication control device 301.

In addition, the control unit 61 of the communication control management device 5 checks the presence or absence of an abnormality with respect to the acquired execution result of the self-diagnosis. If there is an item determined to be abnormal from the execution result of the self-diagnosis (step S317, YES), the control unit 61 notifies an alert indicating that there is an abnormality in the communication control device 301 or the communication system 300 (step S318). Also, if there is no response from the communication control device 301 to the active/nonactive check query, the control unit 61 may notify the presence of an abnormality in the communication control device 301 or the communication system 300.

As described above, in the first operation example of the third embodiment, the communication control management device acquires the analysis information of the communication amount in the communication control device, and sets the time at which the communication control management device causes the communication control device to execute the self-diagnosis based on the analysis information of the communication amount.

Accordingly, the communication control management device can cause the communication control device to execute the self-diagnosis at a time when the communication amount is small and normal communication processing is unaffected even if the self-diagnosis is executed. As a result, the self-diagnosis for confirming the state of the communication control device or finding a trouble or a communication failure at an early stage can be efficiently executed without imposing a load on the primary communication system.

Next, a second operation example of the communication system 300 according to the third embodiment will be described.

Figure 19:
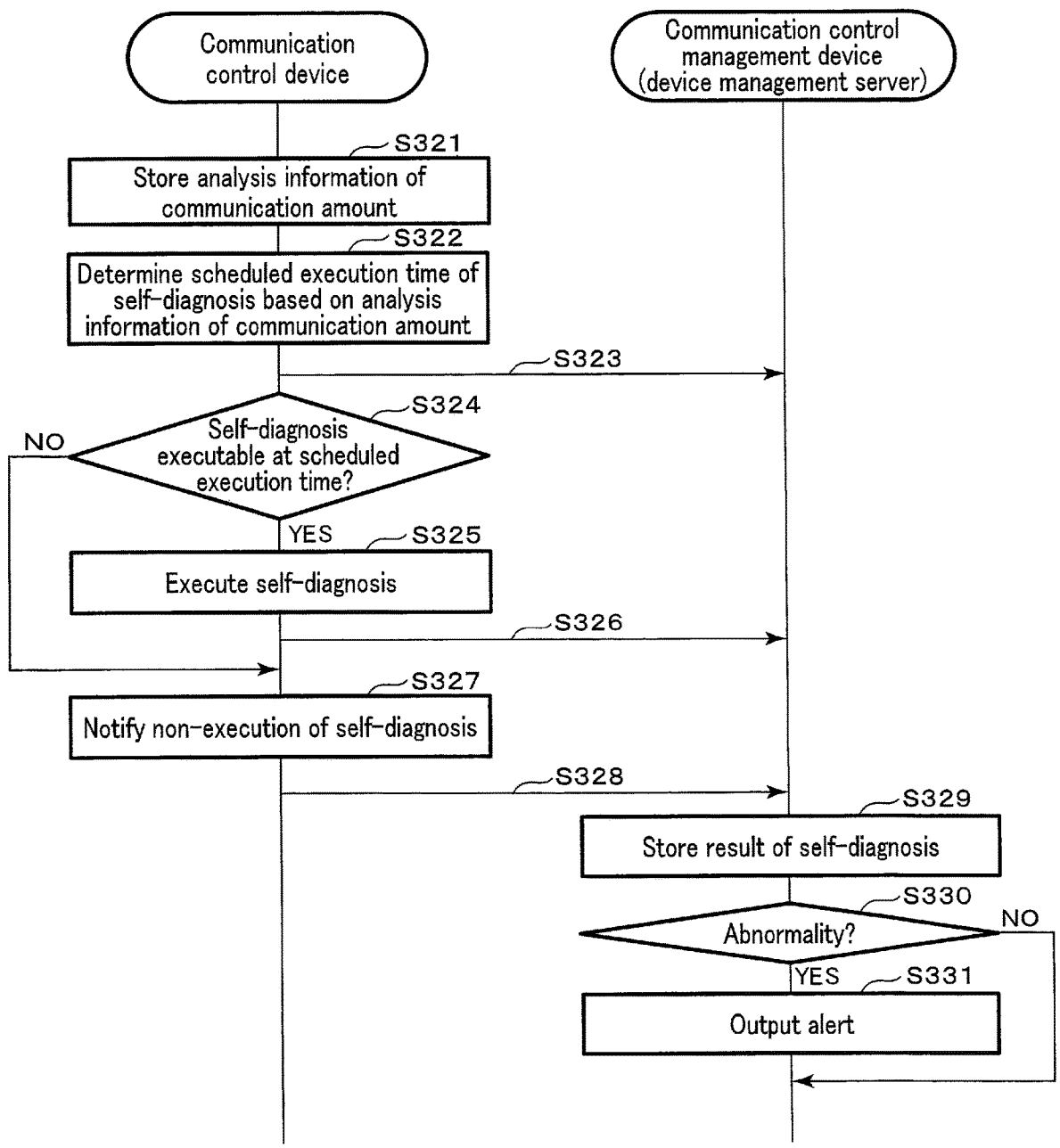
FIG. 19 is a sequence chart for explaining a second operation example of the communication system according to the third embodiment.

FIG. 19 is a sequence chart for explaining the second operation example in the communication system 300 shown in FIG. 17.

As in the first operation example described above, the controller 320 in the communication control device 301 analyzes information indicating the communication amount accumulated as log information in the data memory 324, and stores the analysis information of the communication amount as an analysis result in the data memory 324 (step S321).

The controller 320 of the communication control device 301 determines the scheduled execution time at which the self-diagnosis is scheduled to be executed based on the analysis information of the communication amount stored in the data memory 324 at a predetermined timing (step S322). For example, the controller 320 specifies, as the execution time of the self-diagnosis (scheduled execution time), the time when an amount of time required for the self-diagnosis process can be secured in the time zone in which the communication amount is less than the predetermined threshold value based on the analysis information of the communication amount.

When the scheduled execution time for the self-diagnosis is determined, the controller 320 notifies the communication control management device 5 of the scheduled execution time for the self-diagnosis (S323). In this case, the control unit 61 of the communication control management device 5 may store information indicating the scheduled execution time for the self-diagnosis notified from the communication control device 301 in association with the identification information of the communication control device 301. However, the controller 320 may not notify the communication control management device 5 of the scheduled execution time for the self-diagnosis.

After determining the scheduled execution time for the self-diagnosis, when the scheduled execution time for the self-diagnosis comes, the control unit 61 determines whether the self-diagnosis can be executed by itself (step S324). For example, the controller 320 executes self-diagnosis if the current communication amount is less than a predetermined threshold value.

If the self-diagnosis is to be executed (step S324, YES), the controller 320 executes the self-diagnosis (step S325), and transmits information indicating an execution result of the self-diagnosis to the communication control management device 5. The information indicating the execution result of the self-diagnosis is transmitted from the communication control device 301 and acquired by the communication control management device 5 (step S326).

If the self-diagnosis is not to be executed (step S324, NO), the controller 320 transmits a notification indicating that the self-diagnosis is not executed to the communication control management device 5 (step S327). In this case, a notification indicating that the self-diagnosis is not executed is acquired by the communication control management device 5 as a response to the request to execute the self-diagnosis (step S328).

Upon receipt of a result in reply to the request to execute the self-diagnosis, the control unit 61 of the communication control management device 5 stores the result of the self-diagnosis in the storage unit 66 (step 329). If the self-diagnosis is not executed in the communication control device 30, the control unit 61 stores information indicating that the self-diagnosis is not executed in the storage unit 66 in association with the identification information of the communication control device 301.

In addition, the control unit 61 of the communication control management device 5 checks for the presence or absence of an abnormality with respect to the acquired execution result of the self-diagnosis (step S330). If there is an item determined to be abnormal from the execution result of the self-diagnosis (step S330, YES), the control unit 61 notifies an alert indicating that there is an abnormality in the communication control device 301 or the communication system 300 (step S331).

As described above, in the second operation example of the third embodiment, the communication control device itself sets the scheduled time for executing the self-diagnosis based on the analysis information of the communication amount. Accordingly, the communication control device can plan to execute the self-diagnosis at a time when the communication amount is small and normal communication processing is unaffected even if the self-diagnosis is executed. As a result, the self-diagnosis for confirming the state of the communication control device or finding a trouble or a communication failure at an early stage by the communication control management device can be efficiently executed without imposing a load on the communication system.

Fourth Embodiment

Next, a communication system according to a fourth embodiment will be described.

The communication system according to the fourth embodiment has the same configuration as the communication system 300 according to the third embodiment described above. Therefore, the fourth embodiment will be described as an example applied to the communication system 300 shown in FIG. 17 described for the third embodiment.

Hereinafter, the first to fourth operation examples will be described as operation examples of the communication system 300 according to the fourth embodiment.

Figure 20:
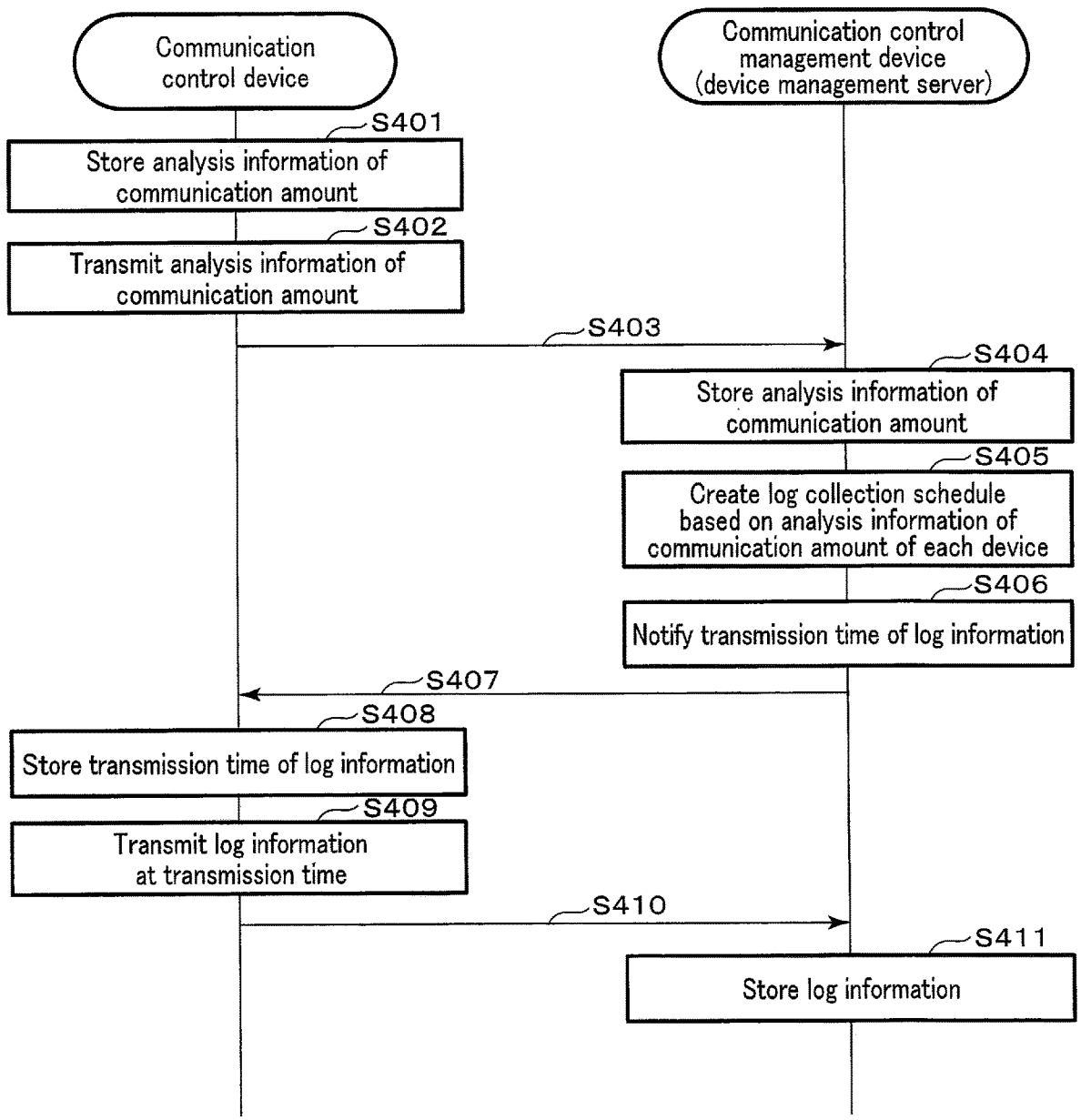
FIG. 20 is a sequence chart for explaining a first operation example of a communication system according to a fourth embodiment.

FIG. 20 is a sequence chart for explaining the first operation example of the communication system 300 according to the fourth embodiment.

First, the communication control device 301 accumulates log information indicating an operation state in the data memory 324. The log information accumulated in the data memory 324 is information indicating the operation history of the communication control device 301. However, information to be urgently notified to the communication control management device 5, such as unauthorized access, may be stored as log information, but is immediately notified to the communication control management device 5.

Information indicating the communication amount in normal operation may be accumulated in the data memory 324 as log information. For example, the controller 320 of the communication control device 301 monitors data passing through the bridges 332 and 334 as communication interfaces, and thereby stores information indicating the communication amount of the communication control device 301 in the data memory 324.

The controller 320 in the communication control device 301 analyzes information indicating the communication amount accumulated as log information in the data memory 324, and stores the analysis information of the communication amount as an analysis result in the data memory 324 (step S401). For example, the controller 320 analyzes the communication amount at a predetermined cycle and records the analysis information of the communication amount in the data memory 324. The analysis information of the communication amount may be, for example, information indicating the communication amount per hour, information indicating the communication amount per time zone and an increase/decrease tendency of the communication amount, or information indicating a time zone in which the communication amount is less than a predetermined threshold value or a time zone in which the communication amount is minimum. In the fourth embodiment, it suffices that the analysis information of the communication amount is information for determining time at which the communication control device 301 transmits log information to the communication control management device (device management server) 5.

The controller 320 of the communication control device 301 transmits the analysis information of the communication amount stored in the data memory 324 to the communication control management device (device management server) 5 (step S402). For example, the controller 320 may transmit the analysis information of the communication amount at a predetermined timing, or may transmit the analysis information in response to a request from the communication control management device 5. In addition, the controller 320 may self-determine a time zone in which the communication amount in the communication control management device 5 is small, and transmit the analysis information of the communication amount to the communication control management device 5 in the time zone in which the communication amount is determined to be small.

The analysis information of the communication amount transmitted from the communication control device 301 is acquired by the communication control management device 5 (step S403). The control unit 61 of the communication control management device 5 stores the analysis information of the communication amount received by the NW communication unit 60 in the storage unit 66 in association with identification information indicating the communication control device 301 which is the transmission source (step S404). The control unit 61 determines a schedule (log collection schedule) for each communication control device 31 to transmit the log information, based on the analysis information of the communication amount from each communication control device 301 stored in the storage unit 66 (step S405). For example, the control unit 301 schedules a time (time zone) when each communication control device 301 can transmit the log information so that the communication amount of the entire network NW is less than a predetermined threshold value, based on the analysis information of the communication amount from each communication control device in the communication system.

When the log collection schedule is created, the control unit 61 notifies individual communication control devices 301 of the time (transmission time) at which the log information is transmitted (step S406). Upon receipt of the notification of the transmission time of the log information from the communication control management device 5 (step S407), the controller 320 of the communication control device 301 stores the transmission time of the log information in the data memory 324 (step S408). The controller 320 transmits the log information accumulated in the data memory 324 to the communication control management device 5 at the transmission time of the log information instructed by the communication control management device 5 (step S409).

The log information transmitted from the communication control device 301 is transmitted to the communication control management device 5 via the network NW and received by the communication control management device 5 (step S410). The control unit 61 of the communication control management device 5 stores the log information received from the communication control device 301 in the storage unit 66 (step 411). For example, the control unit 61 stores the received log information in the storage unit 66 in association with the identification information of the communication control device 301 together with the execution date and time.

In the first operation example according to the fourth embodiment described above, the communication control device connected to the client device transmits analysis information of its own communication amount to the communication control management device, and the communication control management device schedules the time at which individual communication control devices transmit the log information based on the analysis information of the communication amount from each communication control device in the communication system.

Thus, it is not necessary to determine the time at which each communication control device 301 transmits the log information on the basis of the analysis information of the communication amount, and the communication control management device can determine the transmission of the log information by each communication control device in consideration of the communication amount in each communication control device of the entire communication system. As a result, the time at which each communication control device transmits the log information can be controlled in consideration of loads expected to occur in not only individual communication control devices but also the entire network.

Next, a second operation example in the communication system 300 according to the fourth embodiment will be described.

Figure 21:
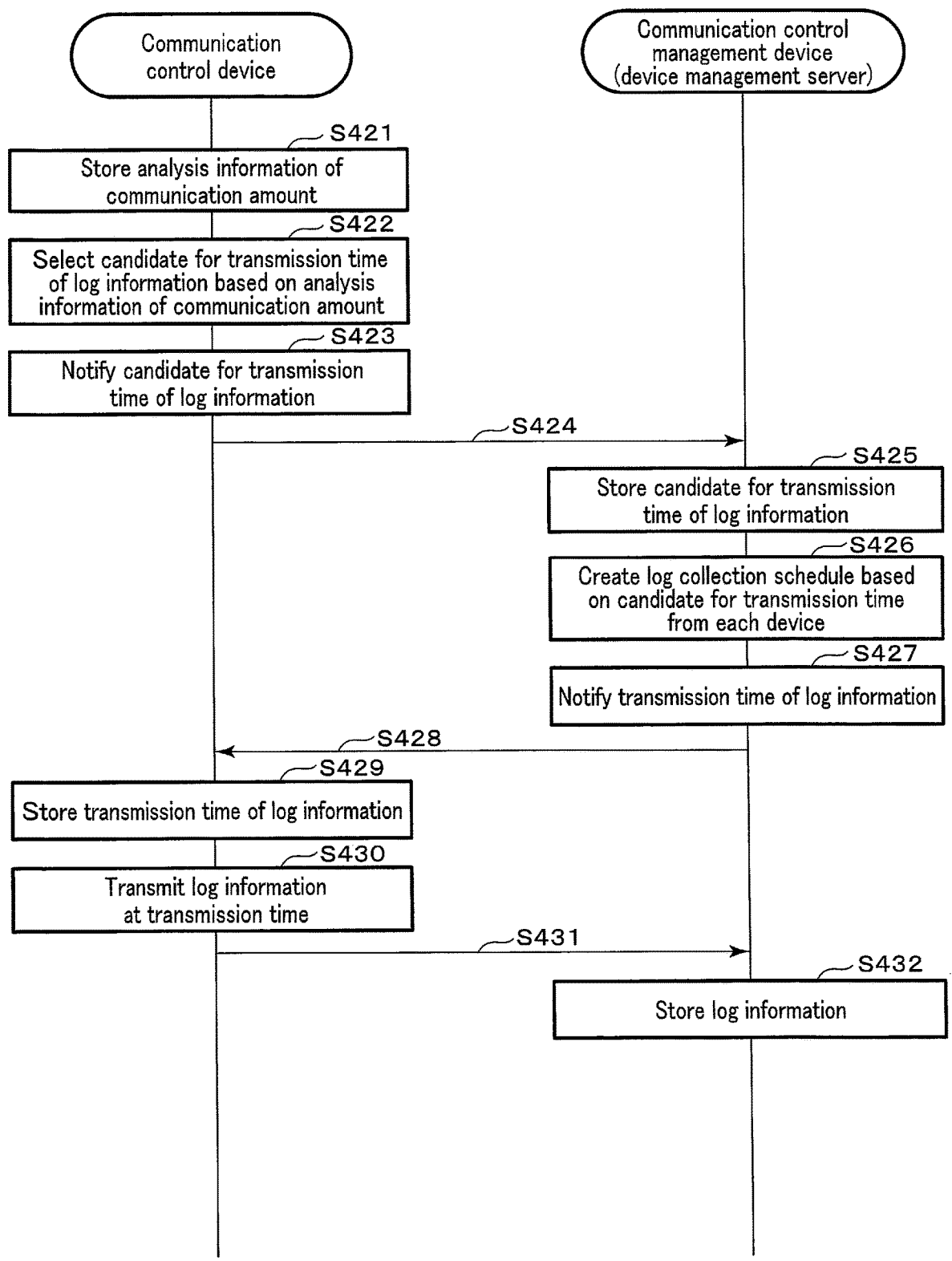
FIG. 21 is a sequence chart for explaining a second operation example of the communication system according to the fourth embodiment.

FIG. 21 is a sequence chart for explaining the second operation example of the communication system 300 according to the fourth embodiment.

First, as in the first operation example described above, the controller 320 in the communication control device 301 analyzes information indicating the communication amount accumulated as log information in the data memory 324, and stores the analysis information of the communication amount as an analysis result in the data memory 324 (step S421).

The controller 320 of the communication control device 301 selects a candidate for the transmission time at which the communication control device 301 transmits the log information based on the analysis information of the communication amount stored in the data memory 324 (step S422). The number of candidates for the transmission time may be one, two or more, or instead indicated as a time zone.

For example, the controller 320 selects, as a candidate for the transmission time, a time when the communication control device 301 can transmit the log information in a time zone in which the communication amount is smallest, based on the analysis information of the communication amount in the communication control device. The controller 320 may select a time (transmission time) when the communication control device 301 can transmit the log information from a time zone in which the communication amount is less than a predetermined threshold value based on the analysis information of the communication amount in the communication control device.

Upon selection of the candidate for the transmission time of the log information, the controller 320 transmits the selected candidate for the transmission time of the log information to the communication control management device 5 (step S424). Thus, the communication control management device 5 acquires the candidate for the transmission time of the log information selected by the communication control device 301.

The control unit 61 of the communication control management device 5 stores the information indicating the candidate for the transmission time of the log information received by the NW communication unit 60 in the storage unit 66, in association with the identification information indicating the communication control device 301 which is the transmission source (step S425). As a result, the information indicating the candidates for the transmission time of the log information from each communication control device 301 in the communication system is accumulated in the storage unit 66.

The control unit 61 of the communication control management device 5 creates a schedule (log collection schedule) of the time at which each communication control device 31 of the entire system transmits the log information, based on the candidates for the transmission time of the log information of each communication control device 301 stored in the storage unit 66 (step S426). For example, the control unit 301 schedules the candidates for the transmission time of the log information from each communication control device so that the communication amount of the entire network NW is less than a predetermined threshold value.

When the schedule of the transmission time of the log information is created, the control unit 61 notifies individual communication control devices 301 of the transmission time at which the log information is transmitted (step S427). Upon receipt of the notification of the transmission time of the log information from the communication control management device 5 (step S428), the controller 320 of the communication control device 301 stores the transmission time of the log information in the data memory 324 (step S429). The controller 320 transmits the log information accumulated in the data memory 324 to the communication control management device 5 at the transmission time of the log information instructed by the communication control management device 5 (step S430).

The log information transmitted from the communication control device 301 is transmitted to the communication control management device 5 via the network NW and received by the communication control management device 5 (step S431). The control unit 61 of the communication control management device 5 stores the log information received from the communication control device 301 in the storage unit 66 (step 432). For example, the control unit 61 stores the received log information in the storage unit 66 in association with the identification information of the communication control device 301 together with the execution date and time.

As described above, in the second operation example according to the fourth embodiment, the communication control device 301 selects the candidate for the transmission time of the log information based on the analysis information of its own communication amount. The communication control management device 5 schedules the candidates for the transmission time of the log information acquired from each communication control device 301 in the communication system 300 so as to reduce the load on the network NW.

Thus, each communication control device 301 can reduce the load on the entire network when the log information is transmitted to the communication control management device. In addition, since each communication control device selects a candidate for the transmission time of the log information, the processing load on the communication control management device 5 can be reduced. As a result, for example, even in a communication system in which the number of communication control devices is large, the time at which each communication control device transmits the log information can be efficiently controlled.

Next, a third operation example in the communication system 300 according to the fourth embodiment will be described.

Figure 22:
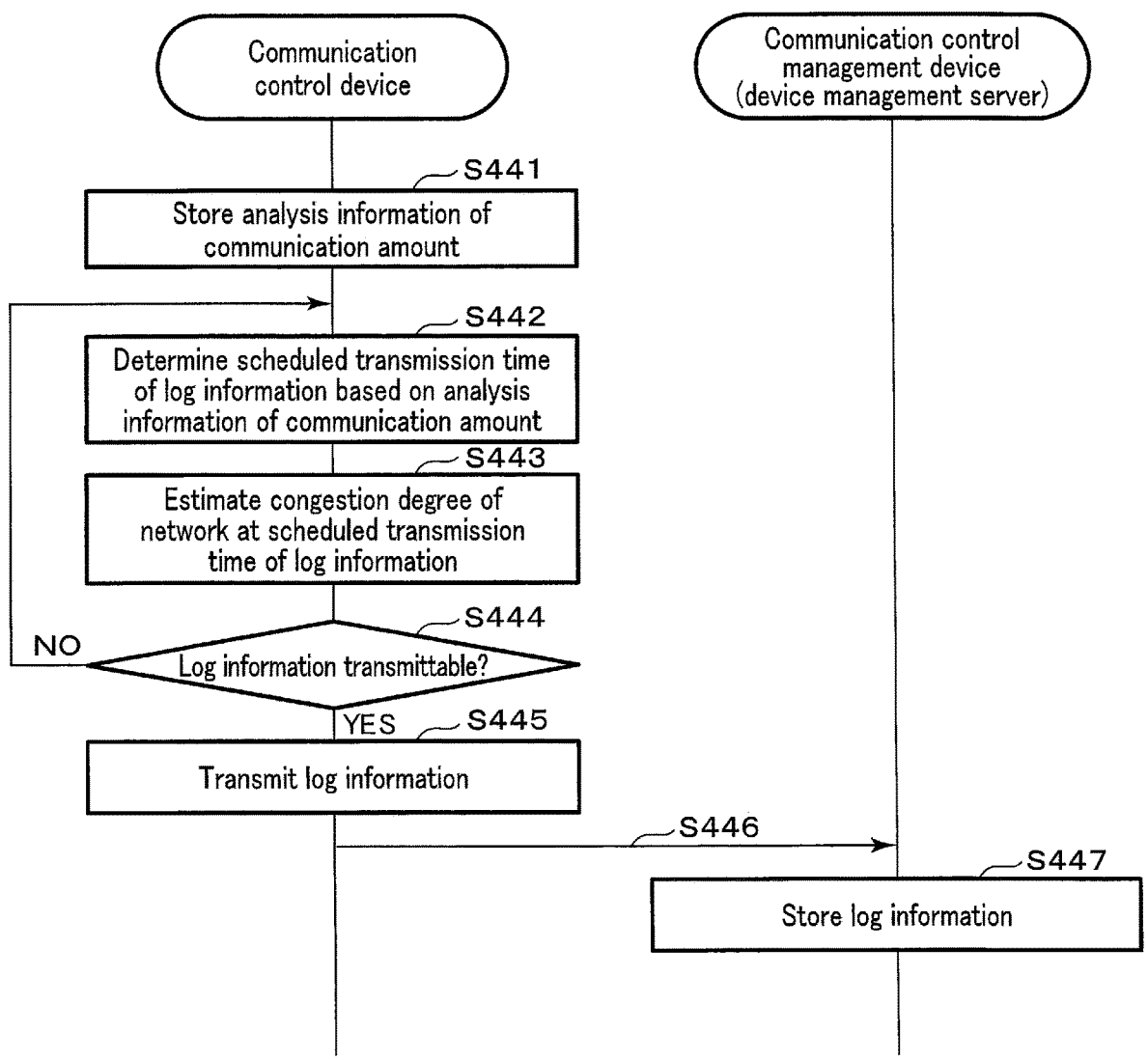
FIG. 22 is a sequence chart for explaining a third operation example of the communication system according to the fourth embodiment.

FIG. 22 is a sequence chart for explaining the third operation example of the communication system 300 according to the fourth embodiment.

First, as in the first operation example described above, the controller 320 in the communication control device 301 analyzes information indicating the communication amount accumulated as log information in the data memory 324, and stores the analysis information of the communication amount as an analysis result in the data memory 324 (step S441).

The controller 320 of the communication control device 301 determines a scheduled transmission time when the communication control device 301 transmits the log information based on the analysis information of the communication amount stored in the data memory 324 (step S442). For example, the controller 320 selects, as a scheduled transmission time, a time when the communication control device 301 can transmit the log information in a time zone in which the communication amount is smallest, based on the analysis information of the communication amount in the communication control device.

Upon selection of the scheduled transmission time of the log information, the controller 320 estimates the congestion degree of the network at the selected scheduled transmission time of the log information (step S443). For example, the controller 320 estimates the congestion degree of the network from the time elapsed between the inquiry for confirming the congestion degree of the network was transmitted to the communication control management device 5 and the receipt of a response from the communication control management device 5. Here, since the inquiry transmitted to the communication control management device 5 is data for estimating the congestion of the network, the inquiry comprises merely small-sized data and does not itself become a load on the network.

If the congestion degree of the network is equal to or higher than the predetermined threshold value (step S444, NO), the controller 320 stops the transmission of the log information. When the transmission of the log information is stopped, the controller 320 selects the scheduled transmission time of transmitting the logo information again from the analysis information of the communication amount.

If the congestion degree of the network is less than the predetermined threshold (step S444, YES), the controller 320 determines that the log information can be transmitted, and transmits the log information accumulated in the data memory 324 to the communication control management device 5 (step S445).

The log information transmitted from the communication control device 301 is transmitted to the communication control management device 5 via the network NW and received by the communication control management device 5 (step S446). The control unit 61 of the communication control management device 5 stores the log information received from the communication control device 301 in the storage unit 66 (step 457).

As described above, in the third operation example according to the fourth embodiment, the communication control device sets the scheduled transmission time of the log information based on the analysis information of its own communication amount. The communication control device estimates the congestion degree of the network when the set scheduled transmission time comes, and transmits the log information to the communication control management device if the congestion degree of the network is less than a threshold value.

This eliminates the need for the communication control management device to determine the transmission time of the log information for individual communication control devices. In addition, individual communication control devices can transmit the log information to the communication control management device after confirming an actual congestion degree of the network at the scheduled transmission time set by itself. As a result, for example, even in a communication system in which the number of communication control devices is large, the processing of the communication control management device 5 does not become large, and the log information can be collected from a large number of communication control devices without imposing a load on the network.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The embodiments and their modifications are covered by the accompanying claims and their equivalents, as would fall within the scope and gist of the inventions.

The invention claimed is:

1. A communication system comprising:
a first communication control device connected between a first device and a network communication network; and
a second communication control device connected between a second device and the network communication network,
the first communication control device including:
a first communication system connected between the first device and the network communication network; and
a second communication system connected between the first device and the network communication network separately from the first communication system,
the first communication system and the second communication system each including:
a first authentication unit;
a first controller configured to request the first authentication unit to perform at least one of a mutual authentication process with the second communication control device using a secret key and a client certificate issued by a private authentication authority or an encryption and decryption process for encrypting information transmitted from the first device to the second device using a common key determined by the first device and the second device, and decrypting information transmitted from the second device to the first device, and to execute communication in a first communication mode for transmitting and receiving plain text data with the first device,
wherein the first controllers of the first communication system and the second communication system execute switching such that one of the communication systems executes communication in the first communication mode, and when a problem is detected in the communication system executing communication in the first communication mode, the other communication system executes communication in the first communication mode, and
the second communication control device including:
a second authentication unit;
a second controller configured to request the second authentication unit to perform at least one of a mutual authentication process with the first communication control device using a secret key and a server certificate issued by the private authentication authority or an encryption and decryption process for encrypting information transmitted from the second device to the first device using a common key determined by the first device and the second device, and decrypting information transmitted from the first device to the second device, and to transmit and receive plain text data with the second device.

2. The communication system according to claim 1, wherein:
the first communication system and the second communication system are arranged in parallel between the first device and the network communication network; and
when a problem is detected in the communication system executing communication in the first communication mode, the first controllers of the first communication system and the second communication system set the communication system in which the problem is detected to a non-communication state and switch the other communication system to the first communication mode.

3. The communication system according to claim 1, wherein:
the first communication system and the second communication system are arranged in series between the first device and the network communication network; and
when a problem is detected in the communication system executing communication in the first communication mode, the first controllers of the first communication system and the second communication system set the communication system in which the problem is detected to a second communication mode that allows data to pass through and switch the other communication system to the first communication mode.

4. The communication system according to claim 1, wherein:
the first communication system and the second communication system each include a communication unit that communicates with a device management server, and
the first controllers of the first communication system and the second communication system transmit, to the device management server, information indicating a problem detected during execution of communication in the first communication mode, and switch the communication system to execute communication in the first communication mode in accordance with an instruction from the device management server.

5. The communication system according to claim 2, wherein:
the first communication system and the second communication system each include a communication unit that communicates with a device management server, and
the first controllers of the first communication system and the second communication system transmit, to the device management server, information indicating a problem detected during execution of communication in the first communication mode, and switch the communication system to execute communication in the first communication mode in accordance with an instruction from the device management server.

6. The communication system according to claim 3, wherein:
the first communication system and the second communication system each include a communication unit that communicates with a device management server, and
the first controllers of the first communication system and the second communication system transmit, to the device management server, information indicating a problem detected during execution of communication in the first communication mode, and switch the communication system to execute communication in the first communication mode in accordance with an instruction from the device management server.

7. A communication control device comprising:
a first communication system connected between a first device and a network communication network; and
a second communication system connected between the first device and the network communication network separately from the first communication system,
the first communication system and the second communication system each including:
an authentication unit;

a controller configured to request the authentication unit to perform at least one of a mutual authentication process with a second communication control device connected between the network communication network and a second device using a secret key and a client certificate issued by a private authentication authority or an encryption and decryption process for, encrypting information transmitted from the first device to the second device using a common key determined by the first device and the second device, and decrypting information transmitted from the second device to the first device, and to execute communication in a first communication mode for transmitting and receiving plain text data with the first device, wherein the controllers of the first communication system and the second communication system execute switching such that one of the communication systems performs communication in the first communication mode, and when a problem is detected in the communication system executing communication in the first communication mode, the other communication system performs communication in the first communication mode.

8. The communication control device according to claim 7, wherein:

the first communication system and the second communication system are arranged in parallel between the first device and the network communication network; and when a problem is detected in the communication system executing communication in the first communication mode, the controllers of the first communication system and the second communication system set the communication system in which the problem is detected to a non-communication state and switch the other communication system to the first communication mode.

9. The communication control device according to claim 7, wherein:

the first communication system and the second communication system are arranged in series between the first device and the network communication network; and when a problem is detected in the communication system executing communication in the first communication mode, the controllers of the first communication system and the second communication system set the communication system in which the problem is detected to a second communication mode that allows data to pass through, and switch the other communication system to the first communication mode.

10. The communication control device according to claim 7, wherein:

the first communication system and the second communication system each include a communication unit that communicates with a device management server; and the controllers of the first communication system and the second communication system transmit, to the device management server, information indicating a problem detected during execution of communication in the first communication mode, and switch the communication system to execute communication in the first communication mode in accordance with an instruction from the device management server.

11. The communication control device according to claim 8, wherein:

the first communication system and the second communication system each include a communication unit that communicates with a device management server; and the controllers of the first communication system and the second communication system transmit, to the device management server, information indicating a problem detected during execution of communication in the first communication mode, and switch the communication system to execute communication in the first communication mode in accordance with an instruction from the device management server.

12. The communication control device according to claim 9, wherein:

the first communication system and the second communication system each include a communication unit that communicates with a device management server; and the controllers of the first communication system and the second communication system transmit, to the device management server, information indicating a problem detected during execution of communication in the first communication mode, and switch the communication system to execute communication in the first communication mode in accordance with an instruction from the device management server.

* * * * *